(12) United States Patent
Setlur et al.

(10) Patent No.: US 10,723,246 B2
(45) Date of Patent: Jul. 28, 2020

(54) LOCK FOR PIVOTING MEMBER IN VEHICLE WITH PUSH BUTTON RELEASE

(71) Applicant: Ford Global Technologies, LLC, Dearborn, MI (US)

(72) Inventors: Raghavan Narayan Setlur, West Bloomfield, MI (US); George Jacob, Kollam (IN); Daniel Jay Osterhoff, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/565,633

(22) Filed: Sep. 10, 2019

(65) Prior Publication Data

US 2020/0001762 A1    Jan. 2, 2020

Related U.S. Application Data

(62) Division of application No. 15/657,262, filed on Jul. 24, 2017, now Pat. No. 10,449,884.

(51) Int. Cl.
| | |
|---|---|
| *B60N 2/36* | (2006.01) |
| *B60N 2/20* | (2006.01) |
| *B60N 2/90* | (2018.01) |
| *B60N 2/75* | (2018.01) |

(52) U.S. Cl.
CPC ............ *B60N 2/366* (2013.01); *B60N 2/206* (2013.01); *B60N 2/757* (2018.02); *B60N 2/919* (2018.02); *B60N 2002/952* (2018.02); *B60N 2205/35* (2013.01)

(58) Field of Classification Search
CPC ........ B60N 2/757; B60N 2/767; B60N 2/919; B60N 2/366; B60N 2/206; B60N 2002/952; B60N 2205/35
USPC ........ 297/378.13, 411.32, 411.38; 296/65.16
See application file for complete search history.

(56) References Cited

U.S. PATENT DOCUMENTS

| | | | |
|---|---|---|---|
| 4,579,384 A | 4/1986 | Sharod | |
| 4,636,005 A | 1/1987 | Bolz et al. | |
| 4,881,767 A | 11/1989 | Kondo | |
| 5,058,240 A | 10/1991 | Barda et al. | |
| 5,562,325 A | 10/1996 | Moberg | |

(Continued)

FOREIGN PATENT DOCUMENTS

DE    102004052746 B3    4/2006

*Primary Examiner* — Milton Nelson, Jr.
(74) *Attorney, Agent, or Firm* — David Coppiellie; Price Heneveld LLP

(57) ABSTRACT

A lock for a pivoting member in a vehicle comprising: a button having a depressed position and an undepressed position; a cam abutting the button having a rotated position and an un-rotated position; and a rod operably connected to the cam having an extended position and a retracted position; wherein, when the button is in the depressed position, the cam is in the rotated position, and the rod is in the retracted position. The pivoting member can be an armrest or a seatback, among other things. The rod includes a first grooved section. The cam includes a first finger adjacent to the first grooved section. As the cam transitions from the un-rotated position to the rotated position, the first finger of the cam interacts with the first grooved section of the rod to cause the rod to transition from the extended position to the retracted position.

20 Claims, 31 Drawing Sheets

(56) References Cited

U.S. PATENT DOCUMENTS

| | | | | |
|---|---|---|---|---|
| 6,572,188 | B2* | 6/2003 | Ozawa | B60N 2/757 |
| | | | | 297/238 |
| 8,353,552 | B2* | 1/2013 | Scheurer, II | B60N 2/3011 |
| | | | | 296/65.09 |
| 9,290,117 | B2 | 3/2016 | Goodhall et al. | |
| 9,637,032 | B2 | 5/2017 | Salenbien et al. | |
| 2006/0061184 | A1 | 3/2006 | Jennings | |
| 2009/0039687 | A1 | 2/2009 | Hinata et al. | |
| 2009/0160227 | A1* | 6/2009 | Crombez | B60N 3/101 |
| | | | | 297/113 |
| 2014/0191529 | A1* | 7/2014 | Okuhara | B60N 3/102 |
| | | | | 296/37.15 |

\* cited by examiner

LOCK FOR PIVOTING MEMBER IN VEHICLE WITH PUSH BUTTON RELEASE

CROSS-REFERENCE TO RELATED APPLICATION

This application is a divisional of and claims priority to U.S. patent application Ser. No. 15/657,262, filed on Jul. 24, 2017, now U.S. Pat. No. 10,449,884, entitled "LOCK FOR PIVOTING MEMBER IN VEHICLE WITH PUSH BUTTON RELEASE," the contents of which are relied upon and incorporated herein by reference in their entirety.

FIELD OF THE DISCLOSURE

The present invention generally relates to a lock, with a push button release, for a member that can pivot, such as an armrest or seatback, in a vehicle.

BACKGROUND OF THE DISCLOSURE

Some vehicles include a component that is meant to pivot for various reasons. For example, some vehicles include an armrest as part of a rear row of seating that is meant to pivot from an upright position relatively flush with adjacent seatbacks to a folded position over a middle seat area of the rear row of seating. As another example, in some vehicles, a seatback of the rear row of seating is meant to pivot from an upright position allowing a passenger to sit and a folded position over the seat, which increases the storage capacity in the rear of the vehicle.

SUMMARY OF THE DISCLOSURE

According to a first aspect of the present disclosure, an armrest for a vehicle comprises: a structural support; an exterior surface; and a lock attached to the structural support, the lock comprising: a button including a push acceptance portion, a terminal portion, a shaft between the push acceptance portion and the terminal portion, a depressed position, and an undepressed position, the push acceptance portion being available for manipulation from the exterior surface; a cam rotatable about an axle and disposed beneath the exterior surface, the cam including a button contacting portion that contacts the terminal portion of the button, a first finger extending from a side of the button contacting portion, a second finger opposite the first finger extending from another side of the button contacting portion, an un-rotated position, and a rotated position; and a rod extending between the first finger and the second finger of the cam, the rod including an elongated shaft that terminates in an end, a first grooved section adjacent the first finger of the cam, a second grooved section adjacent the second finger of the cam, an extended position where at least a portion of the rod extends past the exterior surface, and a retracted position where less or none of the rod extends past the exterior surface; wherein, as the button moves from the undepressed position to the depressed position, the terminal portion of the button pushes the button contacting portion and causes the cam to rotate about the axle from the un-rotated position to the rotated position, and the first finger and the second finger of the cam interact with the first grooved section and the second grooved section respectively of the rod to withdraw the rod from the extended position to the retracted position.

Embodiments of the first aspect of the disclosure can include any one or a combination of the following features:
the push acceptance portion of the button has a concavely contoured depressed surface;
the armrest further comprising one or more springs disposed beneath the exterior surface that bias the button to the undepressed position, the cam to the un-rotated position, and the rod to the extended position;
the cam abuts the button below the exterior surface;
the push acceptance portion of the button is recessed relative to the exterior surface but still available for manipulation from the exterior surface;
the push acceptance portion of the button is at least relatively contiguous with the exterior surface.

According to a second aspect of the present disclosure, a vehicle comprises: a pair of seatbacks; an armrest comprising: an upright position where the armrest is positioned relatively vertically and adjacent to and between the pair of seatbacks; a folded position where the armrest pivots so that it is positioned relatively horizontally; a structural support; an exterior surface; and a lock attached to the structural support, the lock comprising: a button including a push acceptance portion, a terminal portion, a shaft between the push acceptance portion and the terminal portion, a depressed position, and an undepressed position, the push acceptance portion being available for manipulation from the exterior surface; a cam rotatable about an axle and disposed beneath the exterior surface, the cam including a button contacting portion that contacts the terminal portion of the button, a first finger extending from a side of the button contacting portion, a second finger opposite the first finger extending from another side of the button contacting portion, an un-rotated position, and a rotated position; and a rod extending between the first finger and the second finger of the cam, the rod including an elongated shaft that terminates in an end, a first grooved section adjacent the first finger of the cam, a second grooved section adjacent the second finger of the cam, an extended position where at least a portion of the rod extends past the exterior surface and into one of the seatbacks when the armrest is in the upright position so as to prevent the armrest from pivoting to the folded position, and a retracted position where the rod does not extend into the one of the seatbacks so as to not prevent the armrest from pivoting from the upright position to the folded position; wherein, as the button moves from the undepressed position to the depressed position, the terminal portion of the button pushes the button contacting portion and causes the cam to rotate about the axle from the un-rotated position to the rotated position, and the first finger and the second finger of the cam interact with the first grooved section and the second grooved section respectively of the rod to withdraw the rod from the extended position to the retracted position.

Embodiments of the second aspect of the disclosure can include any one or a combination of the following features:
the armrest further comprises a top from the perspective of when the armrest is in the upright position, and the button is disposed at the top;
in the folded position, the armrest is disposed over a middle seat;
the seatback of the pair of seatbacks into which the portion of the rod extends when the rod is in the extended position includes an exterior surface, a back panel, and a locking bracket attached to the back panel, the locking bracket including an aperture;
when the rod is in the extended position and projects beyond the exterior surface of the armrest, beneath the exterior surface of the seatback, and into the aperture of the locking bracket, which prevents the armrest from moving from the upright position to the folded position;

when the button is manipulated to the depressed position, the rod is in the retracted position and does not extend into the aperture of the locking bracket of the seatback, allowing the armrest to be pivoted to the folded position;

the lock further includes one or more springs disposed beneath the exterior surface of the armrest that bias the button to the undepressed position, the cam to the un-rotated position, and the rod to the extended position;

the cam abuts the button below the exterior surface of the armrest;

the lock further includes a support structure that supports the button, the cam, and the rod, the support structure including one or more apertures; and the armrest further includes one or more fasteners disposed through the one or more apertures and into the structural support of the armrest to fasten the lock to the structural support of the armrest.

According to a third aspect of the present disclosure, a vehicle comprises: a seatback comprising: an exterior surface; a structural support; and a lock attached to the structural support, the lock comprising: a button including a push acceptance portion, a terminal portion, a shaft between the push acceptance portion and the terminal portion, a depressed position, and an undepressed position, the push acceptance portion being available for manipulation from the exterior surface; a cam rotatable about an axle and disposed beneath the exterior surface, the cam including a button contacting portion that contacts the terminal portion of the button, a first finger extending from a side of the button contacting portion, a second finger opposite the first finger extending from another side of the button contacting portion, an un-rotated position, and a rotated position; and a rod extending between the first finger and the second finger of the cam, the rod including an elongated shaft that terminates in an end, a first grooved section adjacent the first finger of the cam, a second grooved section adjacent the second finger of the cam, an extended position where at least a portion of the rod extends past the exterior surface, and a retracted position where less or none of the rod extends past the exterior surface; wherein, as the button moves from the undepressed position to the depressed position, the terminal portion of the button pushes the button contacting portion and causes the cam to rotate about the axle from the un-rotated position to the rotated position, and the first finger and the second finger of the cam interact with the first grooved section and the second grooved section respectively of the rod to withdraw the rod from the extended position to the retracted position.

Embodiments of the third aspect of the disclosure can include any one or a combination of the following features:

interior paneling including an aperture;

the seatback further includes an upright position where the seatback is positioned relatively vertically and adjacent to the interior paneling, and a folded position where the seatback is positioned relatively horizontally;

when the seatback is in the upright position, and the button is in the undepressed position, the rod is in the extended position and a portion of the rod projects beyond the exterior surface of the seatback and into the aperture of the interior paneling thus preventing the seatback from moving to the folded position;

when the button is manipulated to the depressed position, the rod is in the retracted position and does not extend into the aperture of the interior paneling, allowing the seatback to be pivoted to the folded position;

the vehicle further comprising a seat positioned relative to the seatback such that when the seatback is in a folded position, the seatback is positioned relatively horizontally over the seat;

interior paneling adjacent to the seatback when the seatback is in an upright position, the interior paneling including a plurality of apertures, each aperture positioned to receive the rod of the lock of the seatback when the seatback is at a particular angle relative to the seat;

when the seatback is in the upright position, and the button is in the undepressed position, the rod is in the extended position and a portion of the rod projects beyond the exterior surface of the seatback and into one of the plurality of apertures of the interior paneling thus preventing the seatback from moving to the folded position or another angle relative to the seat when in the upright position;

the vehicle further comprising an armrest having an upright position where the armrest is disposed relatively vertically and adjacent to the seatback, a folded position where the armrest is disposed relatively horizontally over a seat, and a locking bracket disposed beneath an exterior surface;

when the armrest is in the upright position, and the button of the lock is in the undepressed position, the rod of the lock extends from the seatback and into an aperture of the locking bracket, preventing the armrest from moving to the folded position; and movement of the button to the depressed position moves the rod to the retracted position and removes the rod from the aperture of the locking bracket disposed within the armrest, allowing the armrest to move to the folded position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
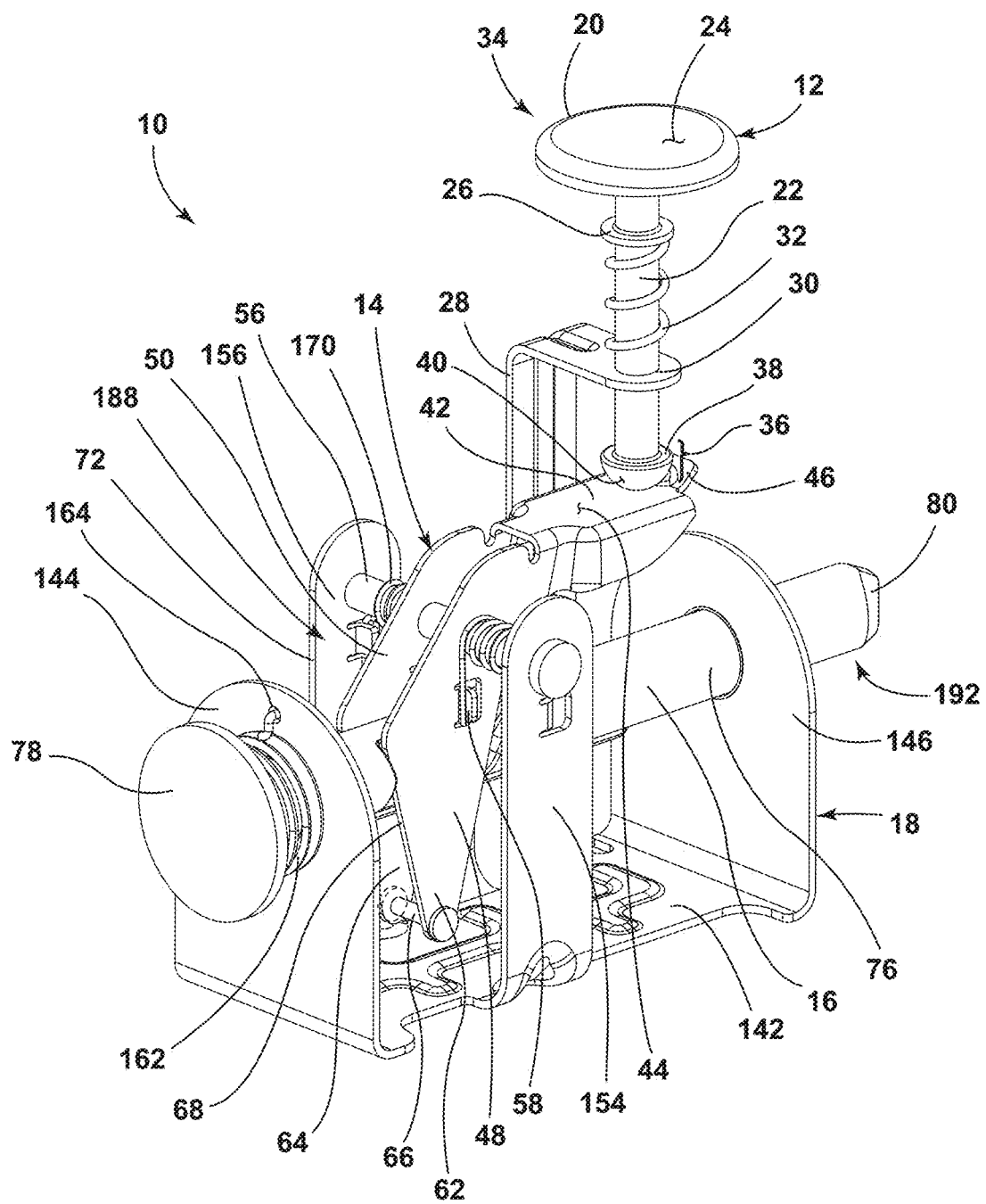
FIG. 1 is a perspective view of a lock for a pivoting member of a vehicle, illustrating a button in operable communication with a cam, which is in operable communication with a rod.
Figure 2:
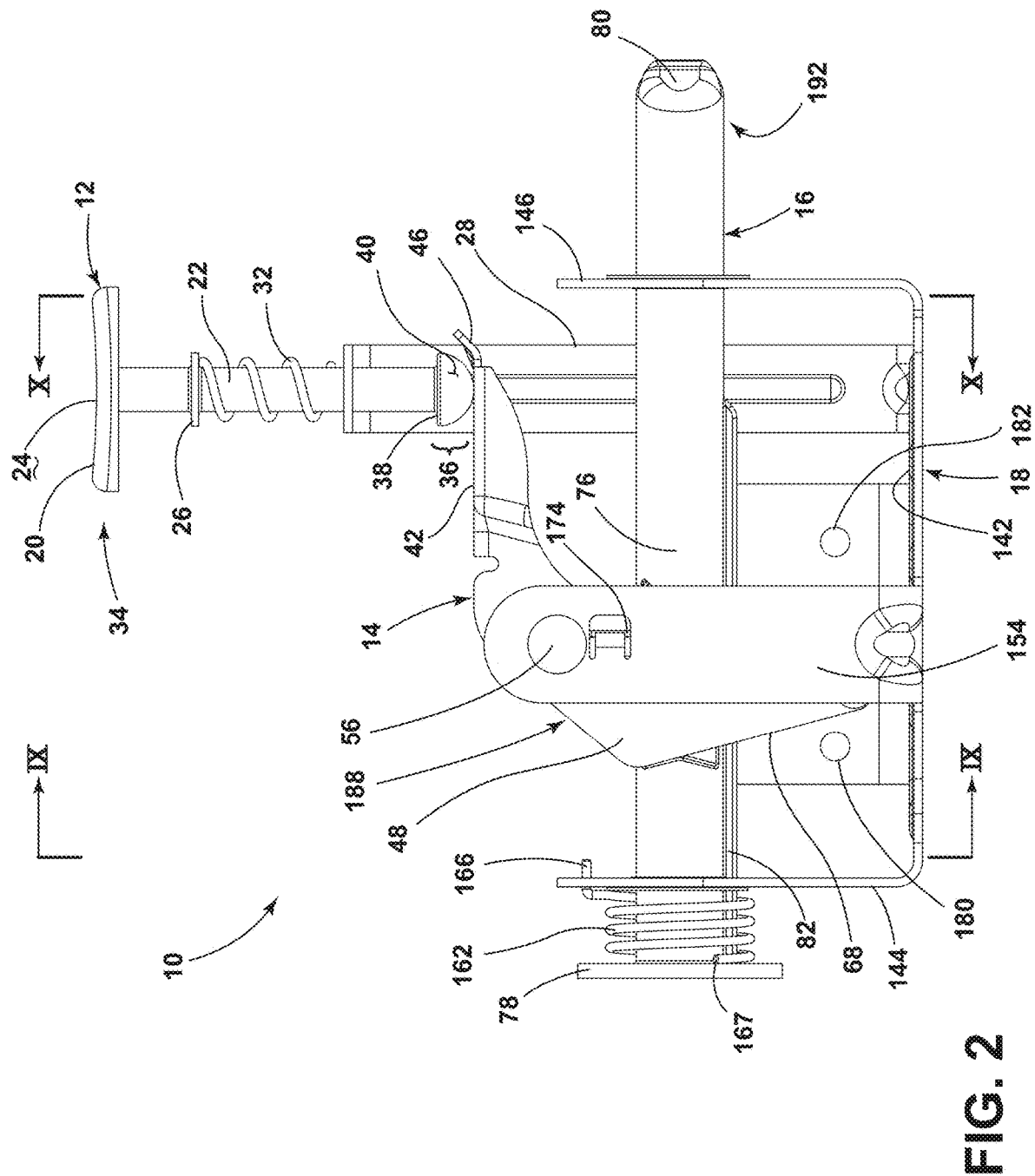
FIG. 2 is a front view of the lock, and the button is in an undepressed position, the cam in an un-rotated position, and the rod in an extended position.
Figure 3:
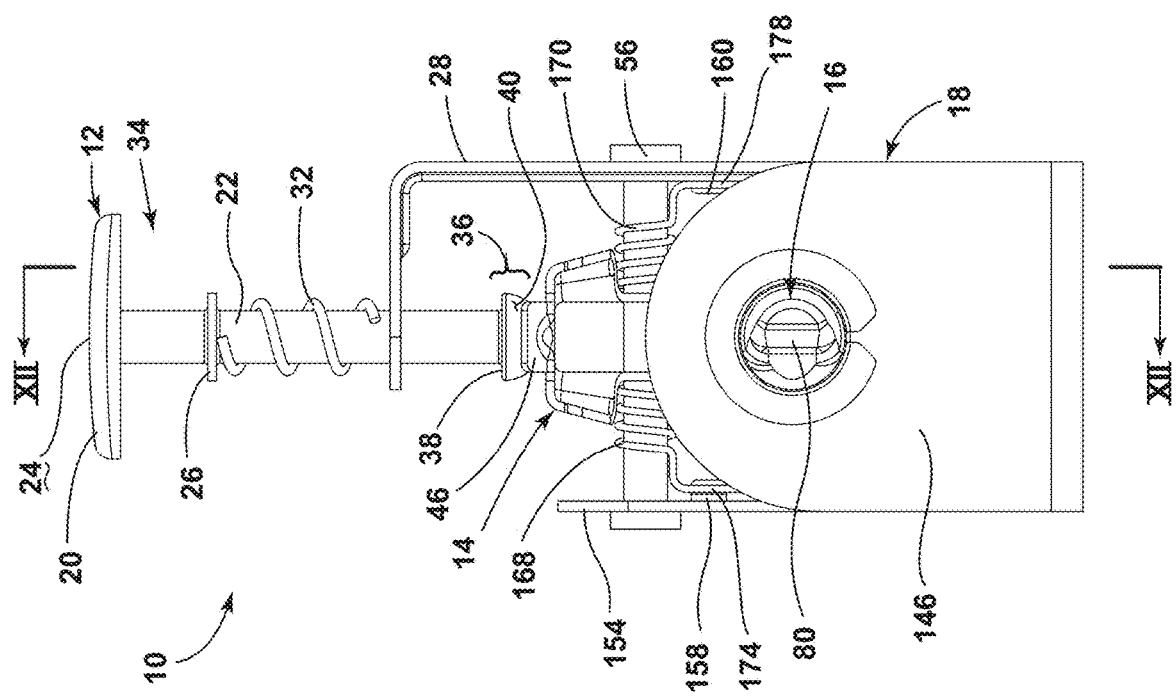
FIG. 3 is a side view of the lock, illustrating a chamfered end of the rod.
Figure 4:
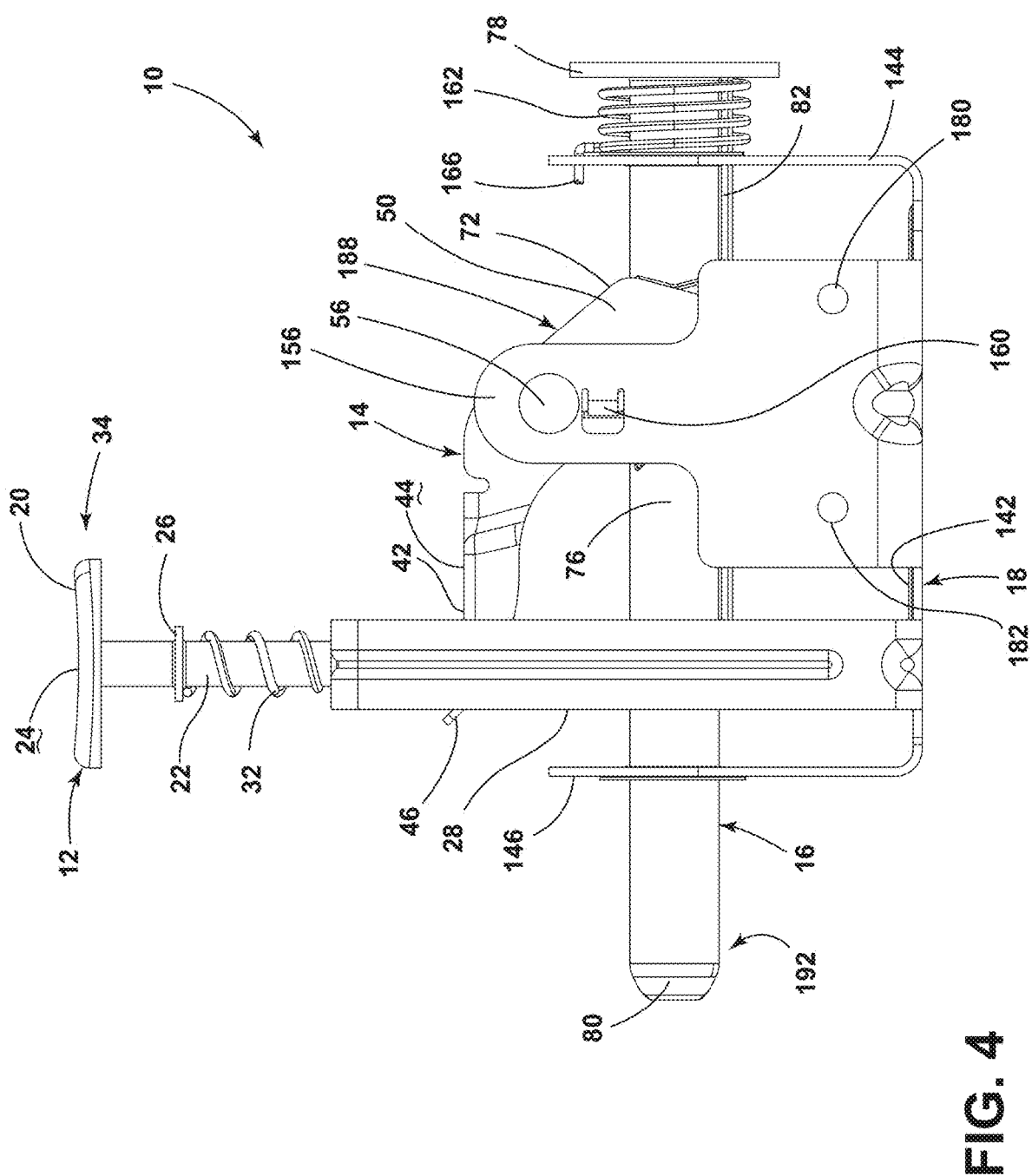
FIG. 4 is a rear view of the lock, illustrating several apertures in a support structure of the lock to allow the lock to attach to structural support within a vehicle.
Figure 5:
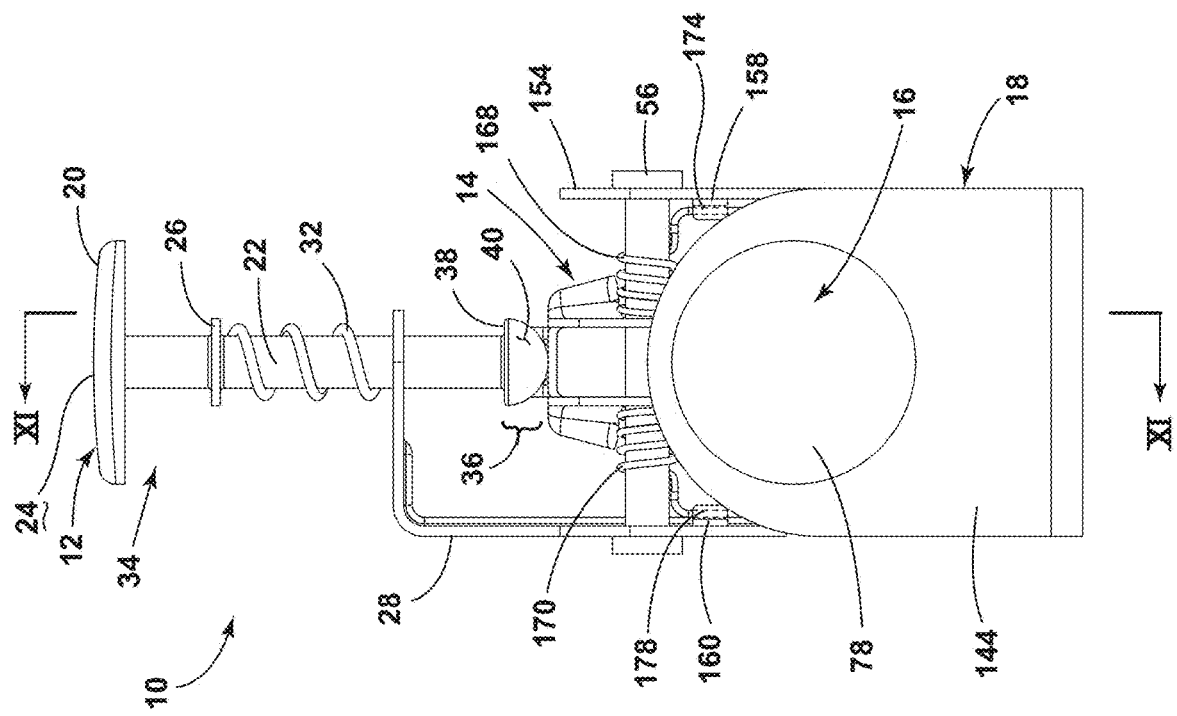
FIG. 5 is a side view of the lock from the opposite side as FIG. 3, illustrating the rod terminating in a collar.
Figure 6:
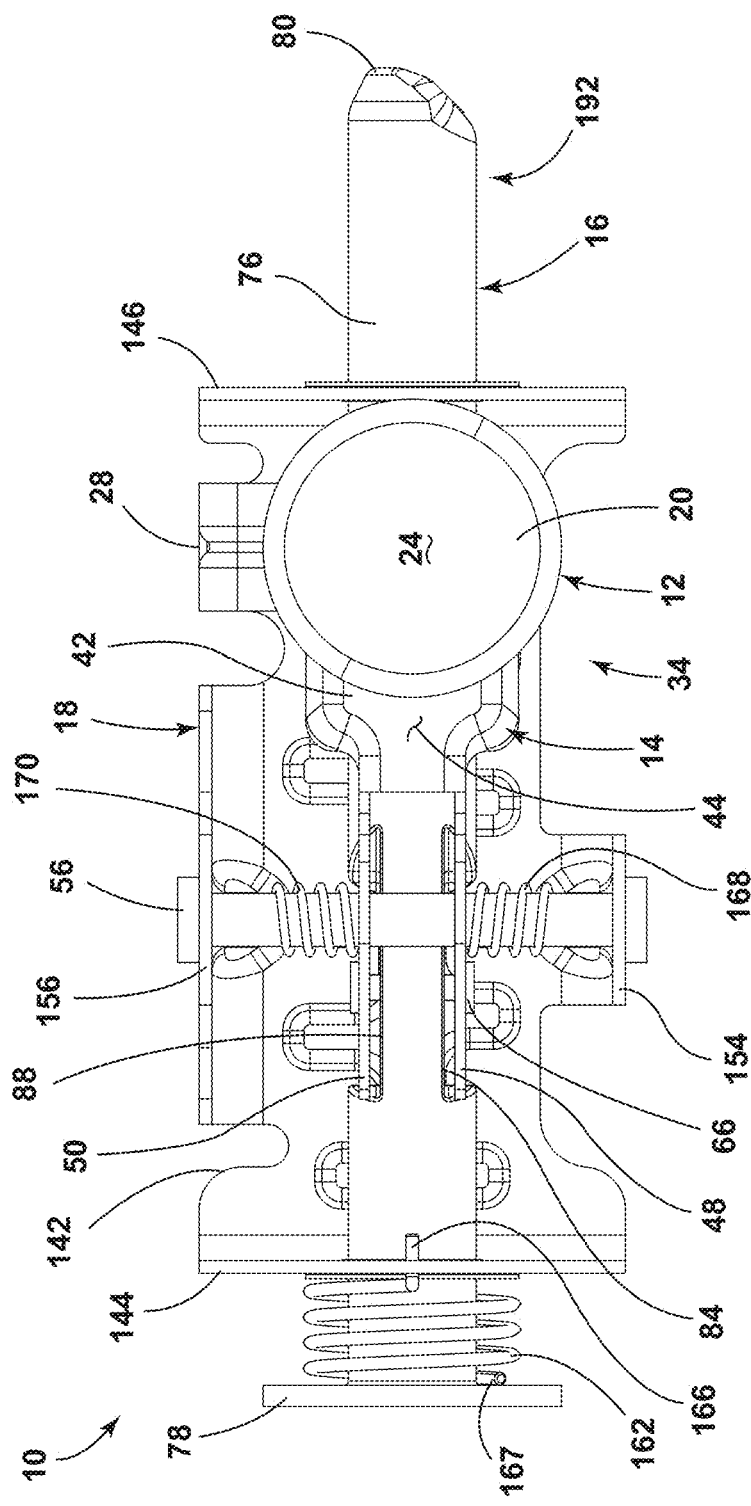
FIG. 6 is a top view of the lock, illustrating a first finger and a second finger of the cam abutting a first grooved section and a second grooved section, respectively, of the rod.
Figure 7:
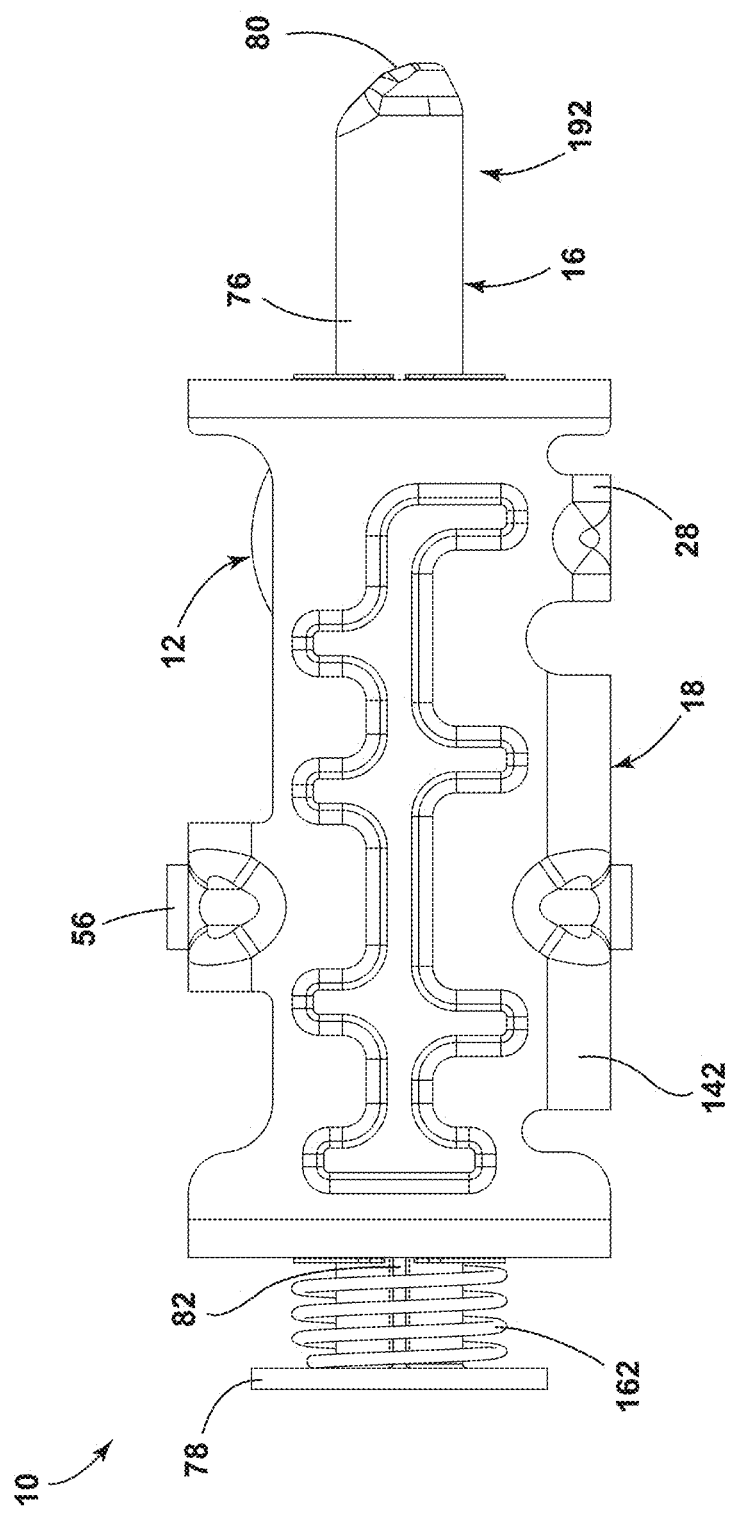
FIG. 7 is a bottom view of the lock, illustrating a base of the support structure.
Figure 8:
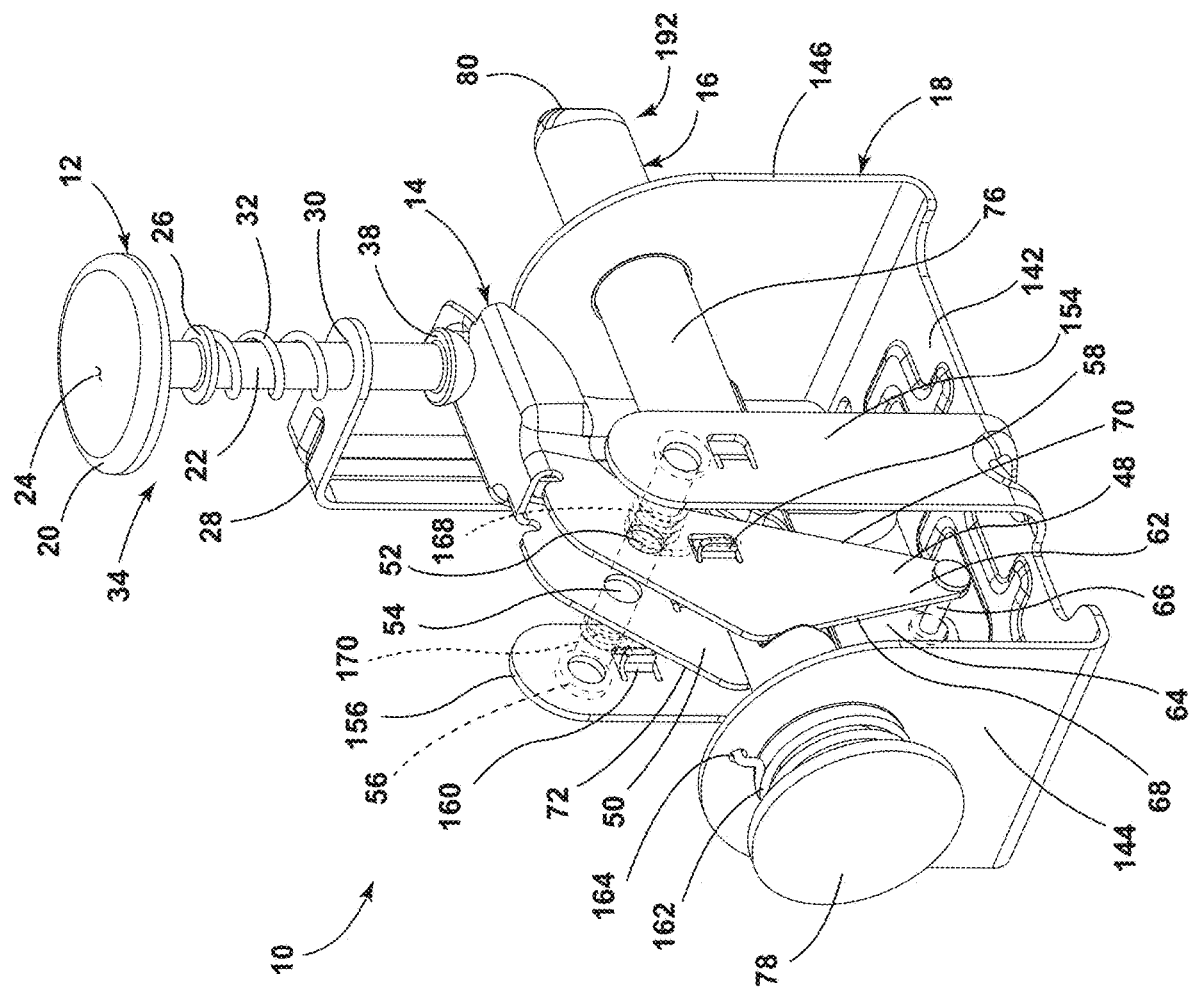
FIG. 8 is a perspective view of the lock, with an axle, providing a rotation axis for the cam, in phantom, to illustrate apertures in the first finger and the second finger through which the axle extends.
Figure 9:
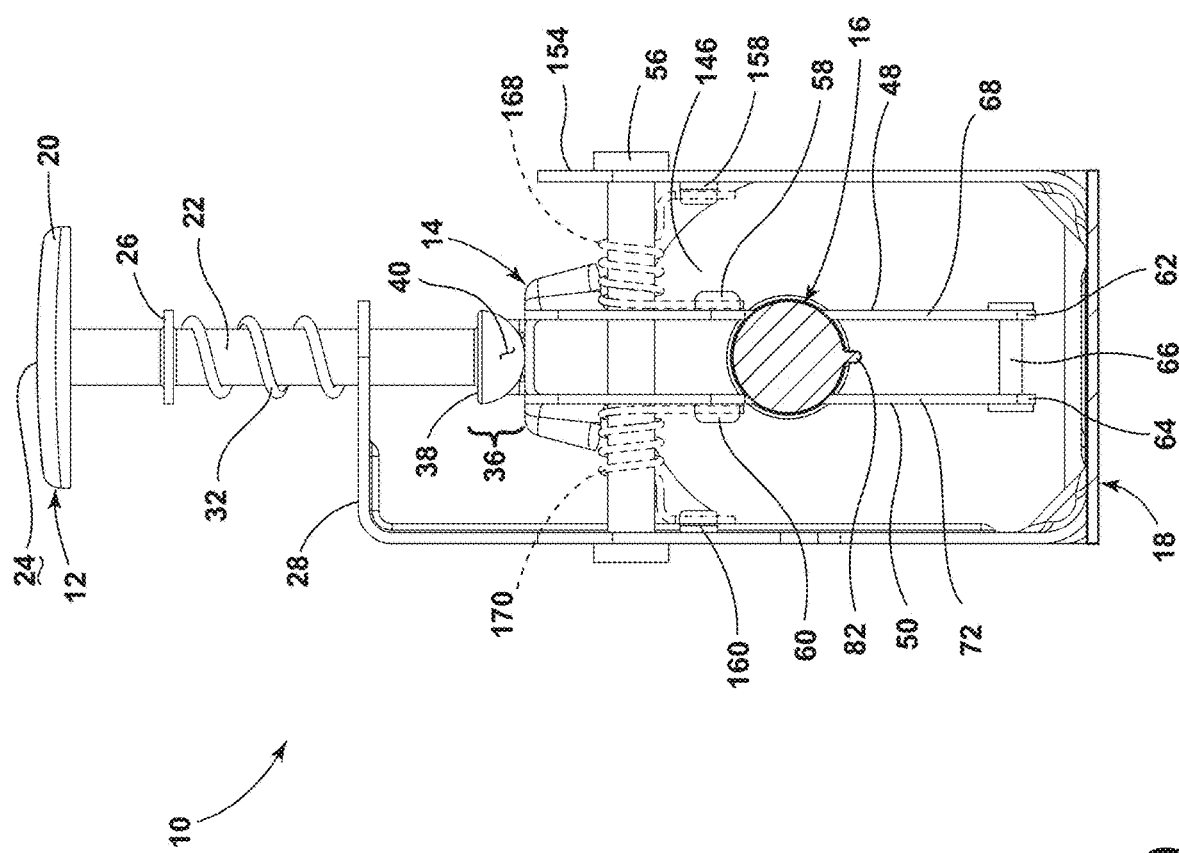
FIG. 9 is a side view of a cross-section of the lock taken through lines IX-IX of FIG. 2, with a first cam spring and a second cam spring shown in phantom and illustrating a bit of the rod.
Figure 10:
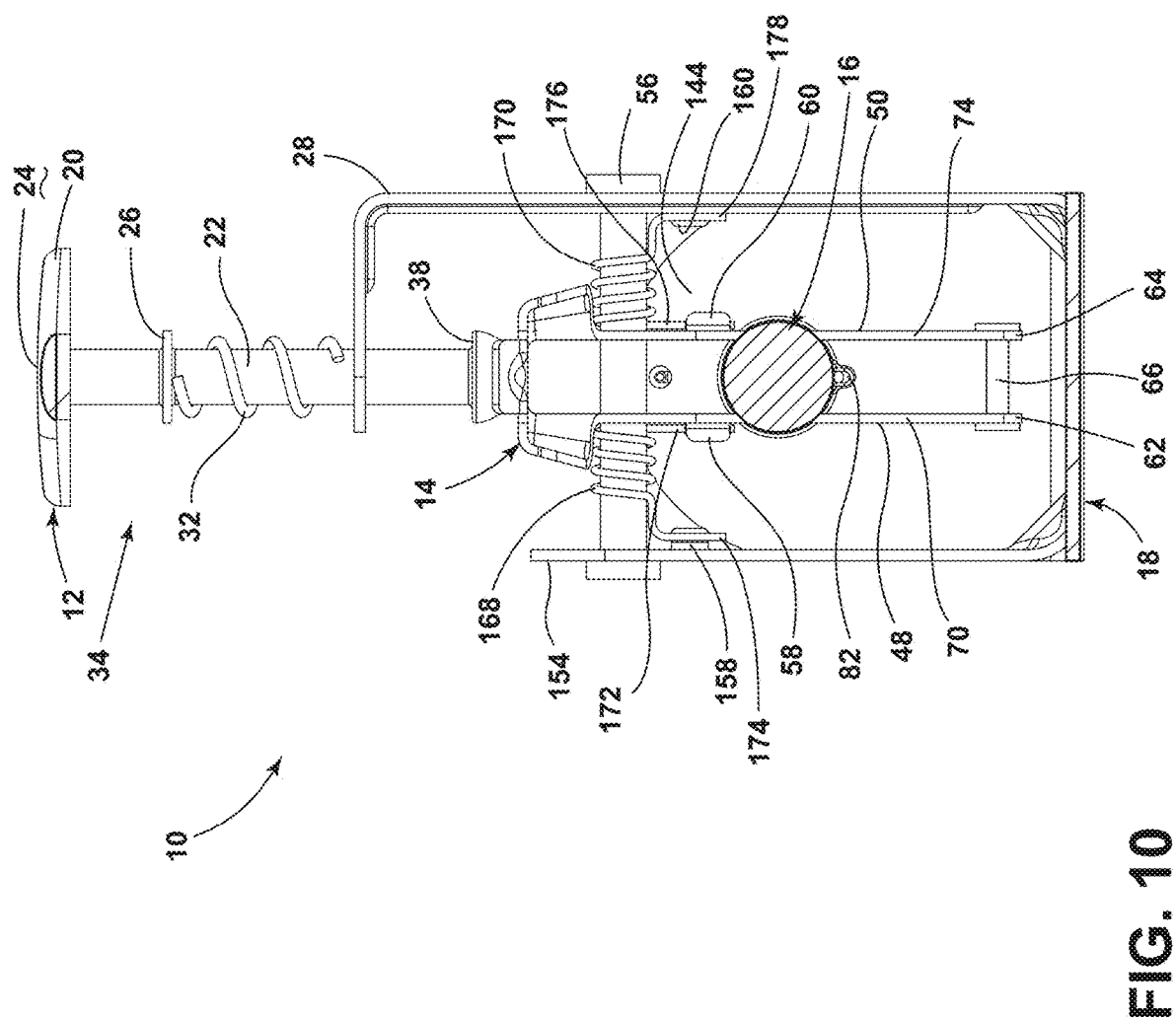
FIG. 10 is a side view of a cross-section of the lock taken through lines X-X of FIG. 2, illustrating a button spring biasing the button to the undepressed position.
Figure 11:
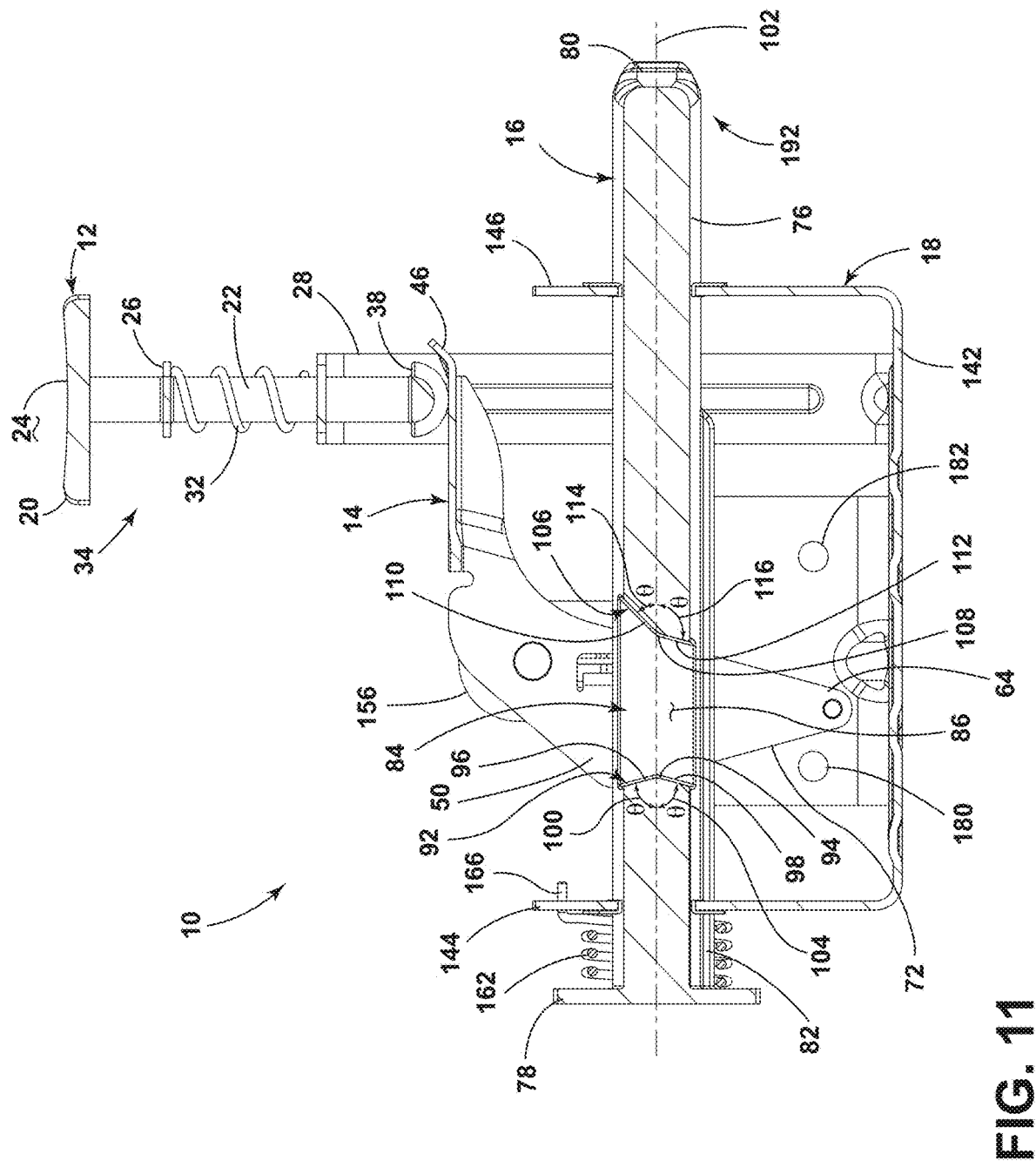
FIG. 11 is a front view of a cross-section of the lock taken through lines XI-XI of FIG. 5, illustrating the first grooved section of the rod, which interacts with the first finger of the cam.
Figure 12:
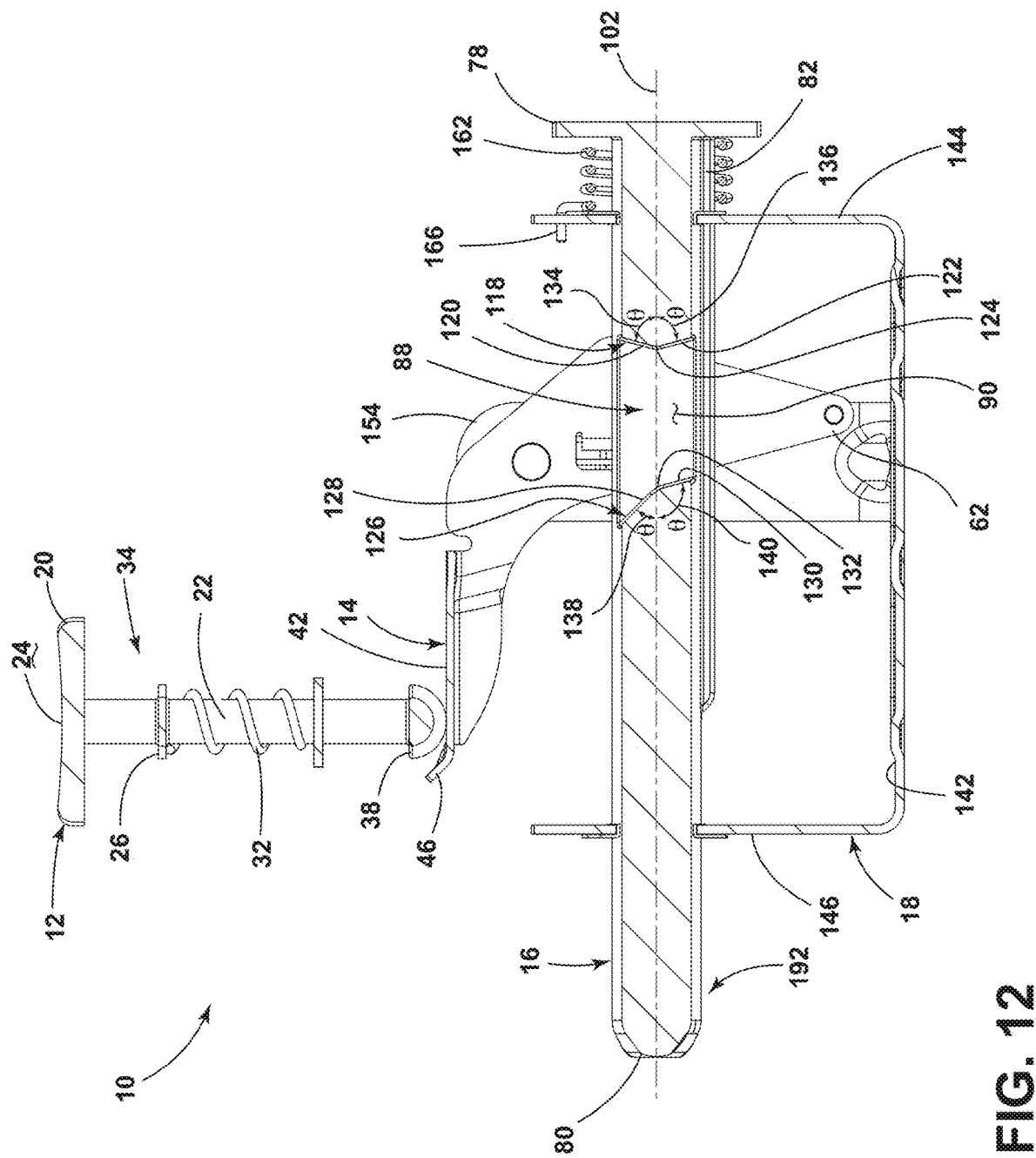
FIG. 12 is a rear view of a cross-section of the lock taken through lines XII-XII of FIG. 3, illustrating the second grooved section of the rod, which interacts with the second finger of the cam.
Figure 13:
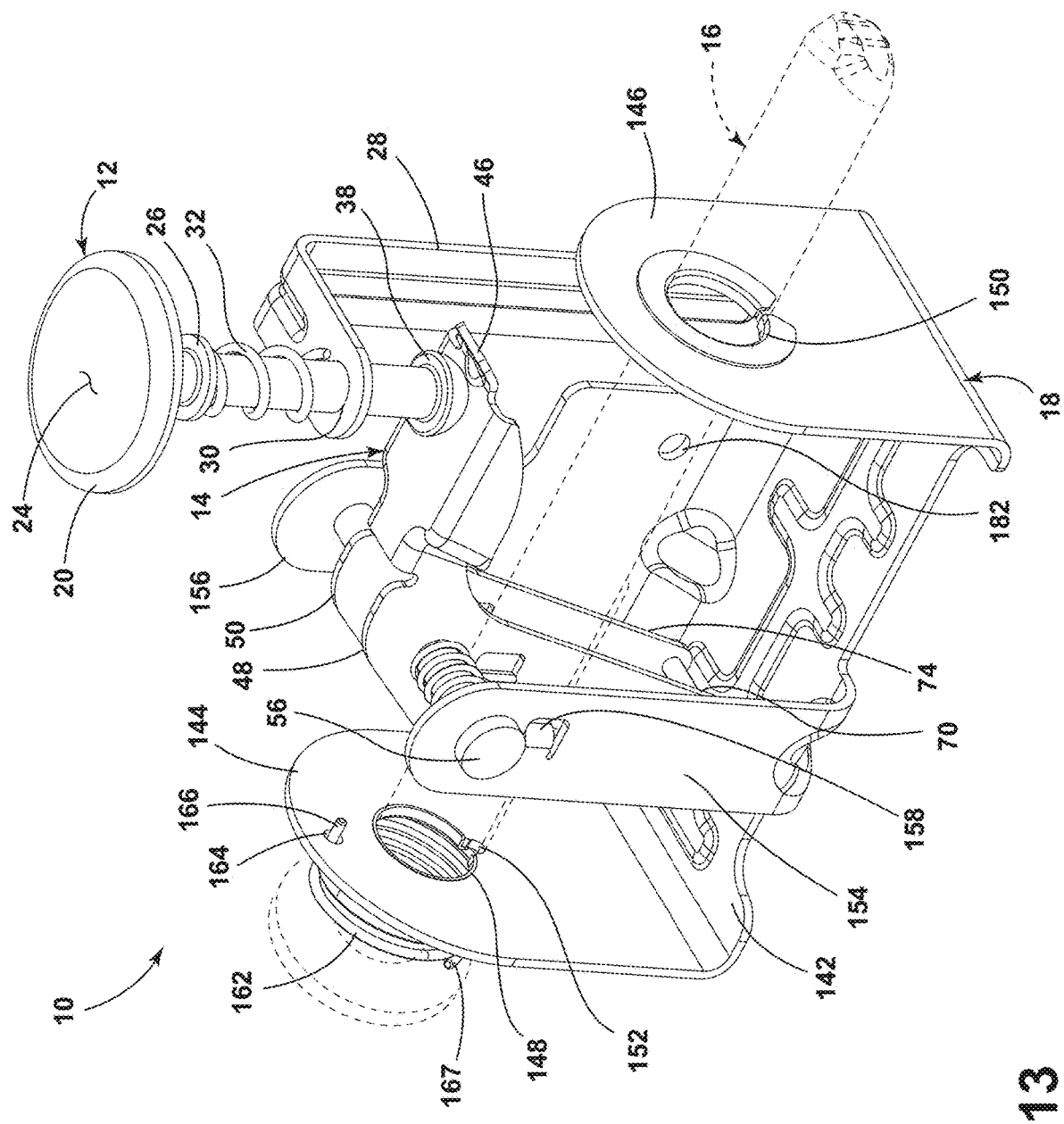
FIG. 13 is a perspective view of the lock, with the rod shown in phantom to illustrate an aperture in a first rod support member and an aperture in a second rod support member of the support structure, through which the rod extends.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-16, a lock 10 for a pivoting member in a vehicle (examples provided below) includes a button 12, a cam 14 abutting the button 12, a rod 16 operably connected to the cam 14, and a support structure 18 at least partially supporting the button 12, cam 14, and rod 16. The button 12, in this embodiment, includes a push acceptance portion 20 and a shaft 22, which can be cylindrical and extending from the push acceptance portion 20 toward the cam 14. The push acceptance portion 20 can be generally circular and include a depressed surface 24, which is concavely contoured and helps to prevent an occupant's thumb or finger from sliding off the push acceptance portion 20 when the occupant imparts a pushing force thereon to manipulate the button 12 (as discussed below). The button 12 further includes a collar 26, which can be cylindrical, extending outward from the shaft 22. The support structure 18 includes a button support member 28 with an aperture 30, and the shaft 22 of the button 12 extends through the aperture 30. As explained further below, the shaft 22 of the button 12 can move through the aperture 30.

The lock 10 further includes a button spring 32 that biases the button 12 upward (that is, to an undepressed position 34, discussed further below). The button spring 32 can be a compression spring through which the shaft 22 of the button 12 extends. The button spring 32 is between the collar 26 of the button 12 and the button support member 28 of the support structure 18. The button 12 terminates with terminal portion 36 on the opposite end of the shaft 22 as the push acceptance portion 20. The terminal portion 36 includes a collared surface 38 that is larger than the aperture 30 of the button support member 28, which retains the button 12 to the support structure 18. The terminal portion 36 includes a cam-contacting surface 40, which contacts the cam 14, as discussed further below. The cam-contacting surface 40 can be arcuate, which provides smooth contacting of the cam 14. The terminal portion 36 can be a hemispherical shape, as in the illustrated embodiment, which provides both the collared surface 38 and cam-contacting surface 40 that is arcuate. The terminal portion 36 can be a separate component from the shaft 22, with the terminal portion 36 being threaded into a chamber (not shown) of the shaft 22.

The cam 14 includes a button contacting portion 42, which receives the force from the button 12 when the button 12 is depressed, more specifically from the cam-contacting surface 40 of the terminal portion 36 of the button 12. The button contacting portion 42 includes a planar surface portion 44 and an angled tab 46 extending upward and outward from the planar surface portion 44. The cam 14 further includes a first finger 48 extending from a side of the button contacting portion 42 and a second finger 50, opposite the first finger 48, extending from the other side of the button contacting portion 42. The first finger 48 and the second finger 50 are generally planar on both sides of the fingers 48, 50 and are orthogonal to the planar surface portion 44 of the button contacting portion 42. Both the first finger 48 and the second finger 50 have a rotation aperture 52, 54, respectively, disposed therein (see particularly FIG. 8). An axle 56, discussed further below, extends through the rotation apertures 52, 54, which allows the cam 14 to rotate about or with the axle 56. Both the first finger 48 and the second finger 50 include a spring tab 58, 60, respectively (see particularly FIGS. 9 and 10). The spring tabs 58, 60, the purpose of which is discussed below, extend orthogonally outward from the first finger 48 and the second finger 50, respectively. Terminal ends 62, 64 of the first finger 48 and the second finger 50 are coupled, in this embodiment to a rod 66. The first finger 48 includes a first edge 68 and a second edge 70 opposite the first edge 68. The first edge 68 and the second edge 70 are orthogonal to the surface surrounding the rotation aperture 52. The second finger 50 likewise includes a first edge 72 and a second edge 74 opposite the first edge 72. The first edge 72 and the second edge 74 are likewise orthogonal to the surface surrounding the rotation aperture 54. The first edge 68 and the second edge 70 of the first finger 48, and the first edge 72 and the second edge 74 of the second finger 50, apply a force to the rod 16 to cause it to move, as discussed below.

The rod 16 includes an elongated shaft 76, which is cylindrical in this embodiment, that terminates on one end with a collar 78 and terminates on the other end with end 80, which can be contoured, such as chamfered. The rod 16 further includes a bit 82 extending out from the elongated shaft 76. The bit 82 extends a length of the rod 16 and terminates adjacent the collar 78. The rod 16 further includes a first grooved section 84 (see particularly FIG. 11) with a planar surface 86 that is, in this embodiment, parallel with the bit 82. The rod 16 further includes a second grooved section 88 (see particularly FIG. 12), on the opposite side of the rod 16 as the first grooved section 84, also with a planar surface 90 that is, likewise in this embodiment, parallel with the bit 82 and the planar surface 86 of the first grooved section 84. The first grooved section 84 includes a first cam-contacting surface 92 orthogonal to the planar surface 86 (see particularly FIG. 11). The first cam-contacting surface 92 is contoured to interact with the first edge 68 of the first finger 48 of the cam 14. In this embodiment, the first cam-contacting surface 92 forms a curved apex 94 pointing down the length of the rod 16 in the direction of the chamfered end 80 of the rod 16, with the two sides of the apex 94 having the same length. More specifically, the first cam-contacting surface 92 includes an α-portion 96 to one side of the apex 94 and a β-portion 98 to the other side of the apex 94. The α-portion 96 of the first cam-contacting surface 92 is at an acute angle 100 relative to a midline 102 of the rod 16. The β-portion 98 of the first cam-contacting surface 92 is at an acute angle 104 relative to the midline 102 of the rod 16, which is the same angle as the acute angle 100 of the α-portion 96. The first grooved section 84 includes a second cam-contacting surface 106 orthogonal to the planar surface 86 of the first grooved section 84 and opposite the first cam-contacting surface 92. The second cam-contacting surface is 106 contoured to interact with the second edge 70 of the first finger 48 of the cam 14. The second cam-contacting surface 106 likewise forms a curved apex 108. More specifically, the second cam-contacting surface 106 includes an α-portion 110 to one side of the apex 108 and a β-portion 112 to the other side of the apex 108. The α-portion 110 of the second cam-contacting surface 106 is at an acute angle 114 relative to the midline 102 of the rod 16. The β-portion 112 of the second cam-contacting surface 106 is at an obtuse angle 116 relative to the midline 102 of the rod 16.

The second grooved section 88 (see particularly FIG. 12) is configured the same as the first grooved section 84, with the planar surface 90, a first cam-contacting surface 118 with an α-portion 120 and a β-portion 122 separated by an apex 124, and a second cam-contacting surface 126 with an α-portion 128 and a β-portion 130 separated by an apex 132. The α-portion 120 of the first cam-contacting surface 118 of the second grooved section 88 is at an acute angle 134 relative to the midline 102 of the rod 16. The β-portion 122 of the first cam-contacting surface 118 of the second grooved section 88 is at an acute angle 136 relative to the midline 102, which is the same angle as the acute angle 134 of the α-portion 120. The α-portion 128 of the second cam-contacting surface 126 of the second grooved section 88 is at an acute angle 138 relative to the midline 102. The β-portion 112 of the second cam-contacting surface 106 of the second grooved section 88 is at an obtuse angle 140 relative to the midline 102. The second cam-contacting surface 126 is contoured to interact with the second edge 74 of the second finger 50 of the cam 14.

The support structure 18 supports the button 12, the cam 14, and the rod 16. The support structure includes a base 142. A first rod support member 144 and a second rod support member 146 extend, in this embodiment, orthogonally, from the base 142. The second rod support member 146 is disposed on the opposite side of the base 142 from the first rod support member 144. The first rod support member 144 and the second rod support member 146 structurally support the rod 16. Both the first rod support member 144 and the second rod support member 146 include an aperture 148, 150 respectively (see particularly FIG. 13), through which the rod 16 is slidably inserted. The aperture 148 of the first rod support member 144 includes a slot 152. The bit 82 of the rod 16 is slotted into the slot 152 and able to slide therethrough. The slot 152 and the bit 82 cooperate to prevent the rod 16 from rotating during use.

The support structure 18 further includes a first cam support member 154 and a second cam support member 156 extending from the base 142. The second cam support member 156 is opposite the first cam support member 154. Both the first cam support member 154 and the second cam support member 156 extend orthogonally from the base 142 and are both orthogonal to the first rod support member 144 and the second rod support member 146. The first cam support member 154 and the second cam support member 156 support the axle 56, mentioned above, which in turn, rotatably supports the cam 14. Thus, the cam 14 is rotatably connected to the support structure 18, in this embodiment, through the axle 56. Both the first cam support member 154 and the second cam support member 156 include a spring tab 158, 160, respectively, that extends medially (that is, toward the first finger 48 and second finger 50, respectively) and orthogonally. The cam 14 is positioned relative to the rod 16 such that the rod 16 is between the first finger 48 and the second finger 50 of the cam 14. Further, the rod 16 is between the axle 56, which acts as the rotation axis for the cam 14, and the rod 66 connecting the first finger 48 and the second finger 50. The first finger 48 of the cam 14 is adjacent the first grooved section 84. The second finger 50 of the cam 14 is adjacent the second grooved section 88. The first edge 68 of the first finger 48 is adjacent and interacts with the first cam-contacting surface 92 of the rod 16. The second edge 70 of the first finger 48 is adjacent and interacts with the second cam-contacting surface 106 of the rod 16. The first edge 72 of the second finger 50 is adjacent and interacts with the first cam-contacting surface 118 of the rod 16. The second edge 74 of the second finger 50 is adjacent and interacts with the second cam-contacting surface 126 of the rod 16. The support structure 18 positions the cam 14 such that the cam 14 interacts with the first grooved section 84 and the second grooved section 88 of the rod 16 between the first rod support member 144 and the second rod support member 146.

As mentioned above, the support structure 18 further includes the button support member 28 with aperture 30. The shaft 22 of the button 12 extends through and can move within the aperture 30. The button support member 28 positions the button 12 such that the cam-contacting surface 40 of the button 12 is disposed adjacent the planar surface portion 44 of the button contacting portion 42 of the cam 14. The support structure 18 further includes aperture 180 and aperture 182, which as detailed below, provide an opportunity to fasten the lock 10 to another component of a vehicle.

The lock 10 further includes one or more springs interacting with one or more of the button 12, the cam 14, and the rod 16. In this embodiment, the lock 10 includes the button spring 32. The button spring 32 can be a compression spring through which the shaft 22 of the button 12 extends. The button spring 32 is between the collar 26 of the button 12 and the button support member 28 of the support structure 18.

The lock 10 further includes a rod spring 162. The rod spring 162 can be a compression spring. A portion of the elongated shaft 76 of the rod 16 extends through the rod spring 162. The rod spring 162 is disposed between and adjacent to the collar 78 of the rod 16 and the first rod support member 144 of the support structure 18. The first rod support member 144 includes an aperture 164 and one end 166 of the rod spring 162 is inserted through the aperture 164, which helps maintain the rod spring 162 in place. The rod spring 162 can serve to prevent the collar 78 from moving too closely to the first rod support member 144. Moreover, in other embodiments (not illustrated) another end 167 of the rod spring 162 can be attached to the rod 16.

The lock 10 further includes a first cam spring 168 and a second cam spring 170. The axle 56 providing the rotation axis for the cam 14 extends through both the first cam spring 168 and the second cam spring 170. The first cam spring 168 includes a medial end 172 and a lateral end 174 (see particularly FIG. 10). The second cam spring 170 includes a medial end 176 and a lateral end 178. The lateral end 174 of the first cam spring 168 abuts the spring tab 158 of the first cam support member 154. The medial end 172 of the first cam spring 168 abuts the spring tab 58 of the first finger 48 of the cam 14. The lateral end 178 of the second cam spring 170 abuts the spring tab 160 of the second cam support member 156. The medial end 176 of the second cam spring 170 abuts the spring tab 60 of the second finger 50 of the cam 14.

Figure 14:
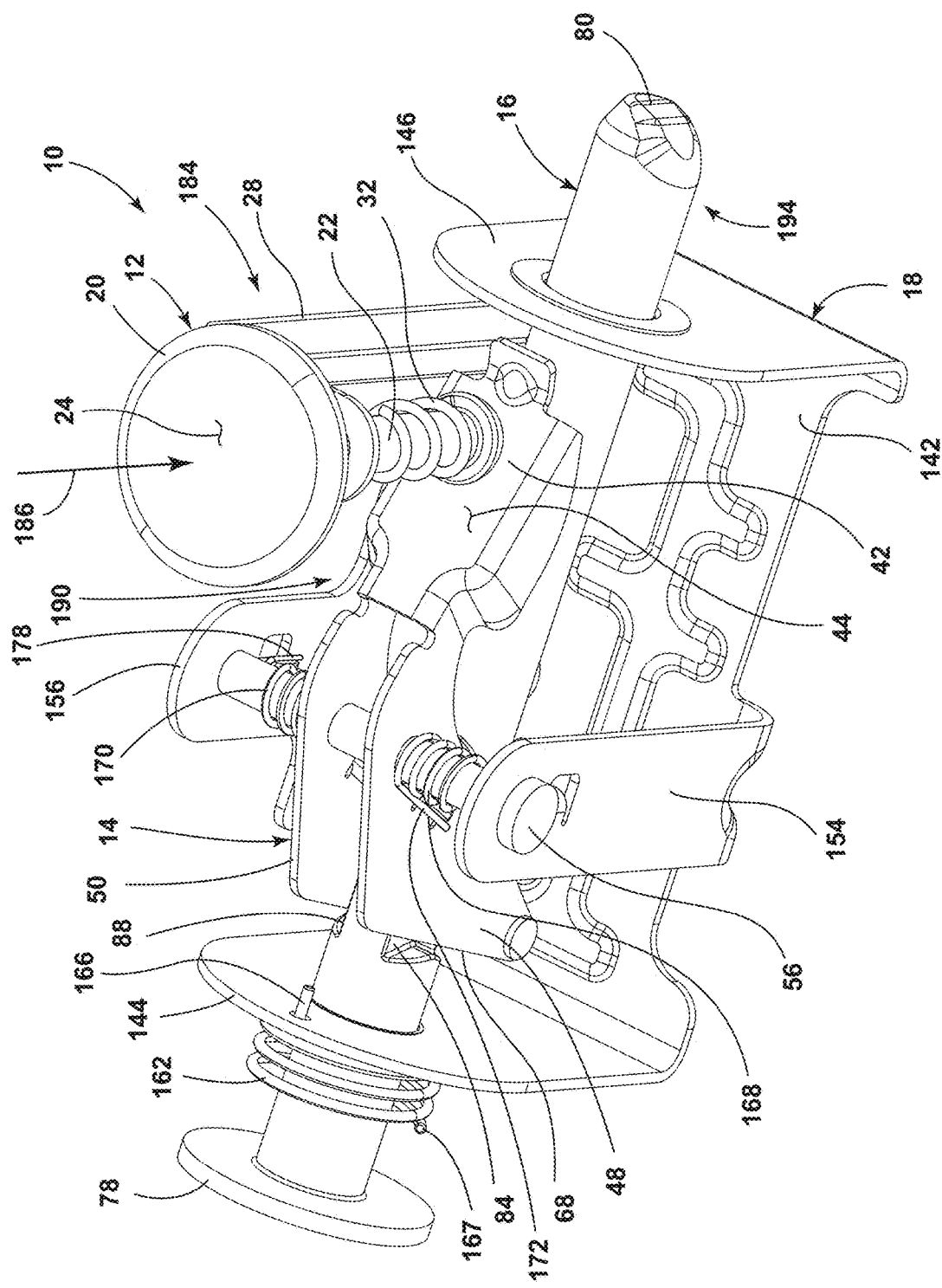
FIG. 14 is a perspective view of the lock, with a force forcing the button to a depressed position, which forces the cam to a rotated position, which forces the rod to a retracted position.
Figure 15:
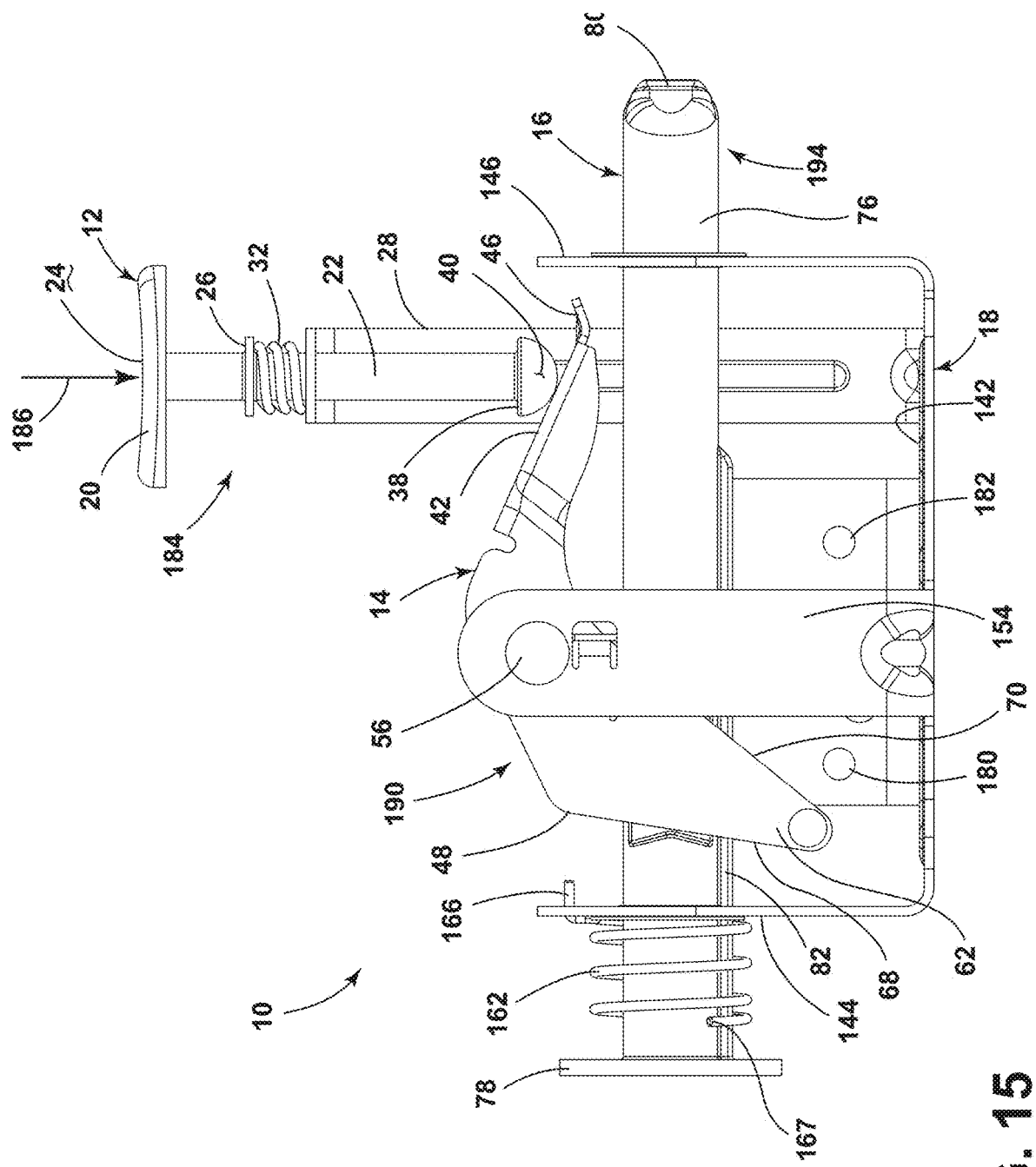
FIG. 15 is a front view of the lock, with the force forcing the button to the depressed position, which forces the cam to the rotated position, which forces the rod to the retracted position.
Figure 16:
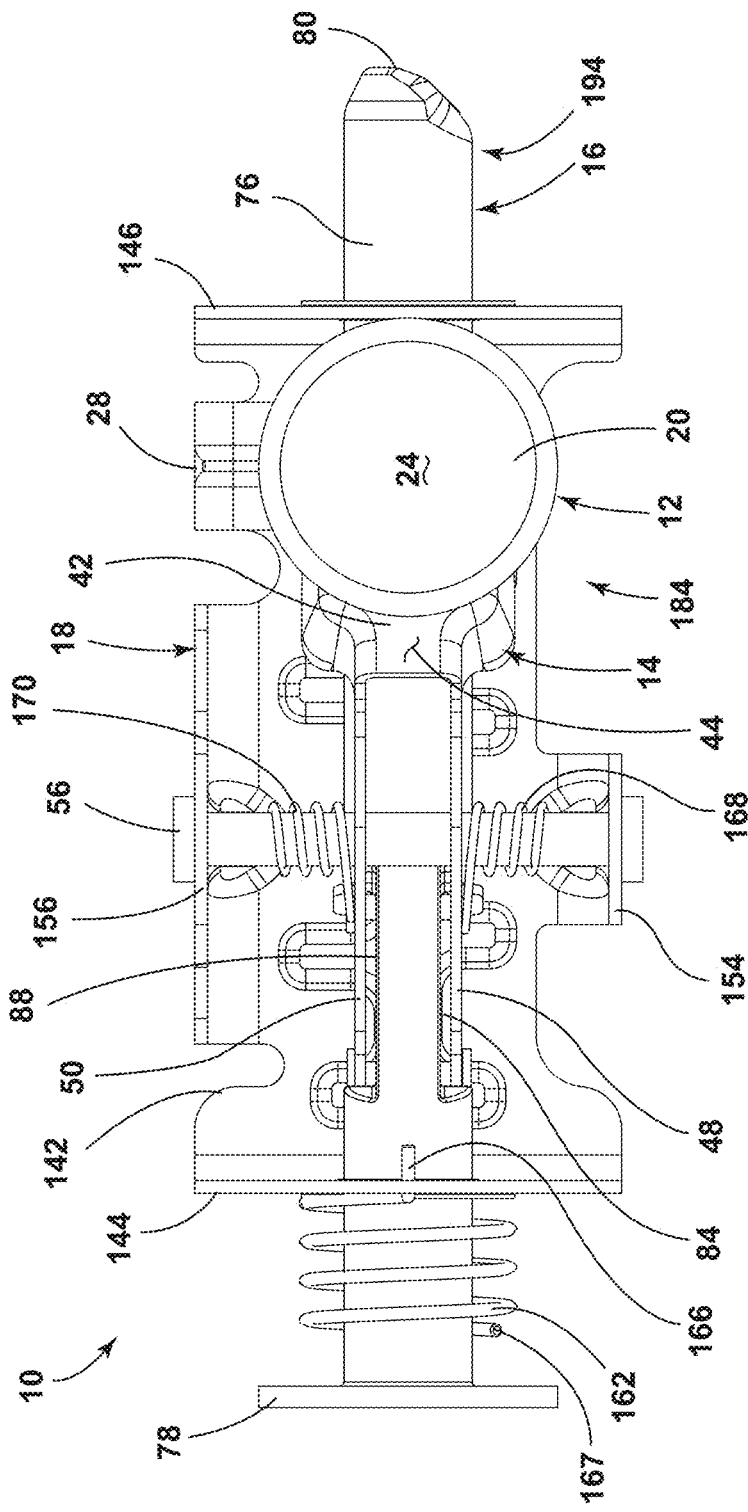
FIG. 16 is a top view of the lock, with the force forcing the button to the depressed position, which forces the cam to the rotated position, which forces the rod to the retracted position.
Figure 17:
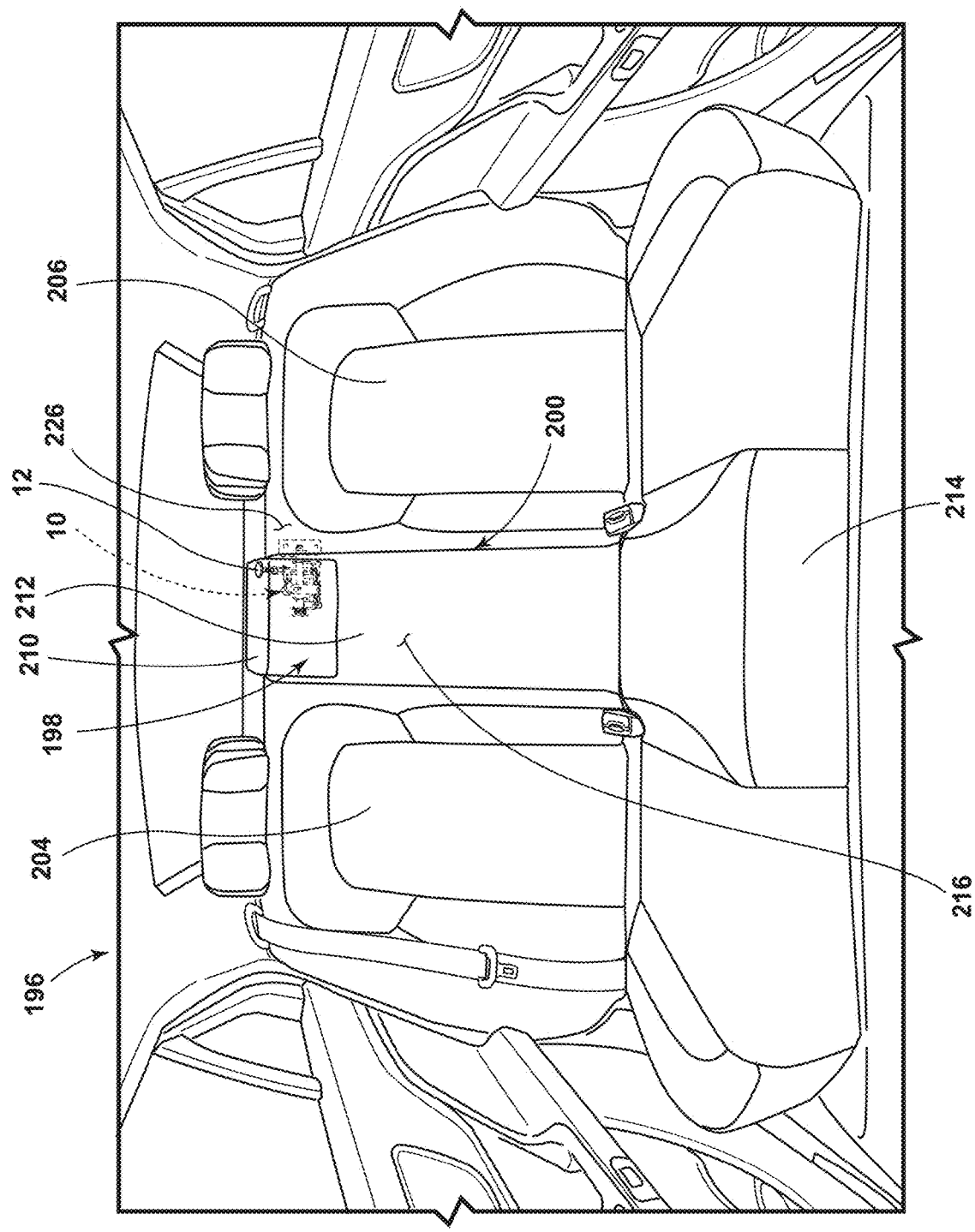
FIG. 17 is a front view of the lock of FIG. 1 disposed within an armrest in an upright position and the rod of the lock is in the extended position extending into an aperture of a bracket within an adjacent seatback, locking the armrest in the upright position.

The button 12 has, and can transition to, from, and between, the undepressed position 34 (see FIGS. 1-13) and a depressed position 184 (see FIGS. 14-16). An occupant applying force 186 to the button 12 causes the button 12 to move from the undepressed position 34 to the depressed position 184. As the button 12 moves from the undepressed position 34 to the depressed position 184, the button 12 causes the cam 14 to move from an un-rotated position 188 (see FIGS. 1-13) to a rotated position 190 (see FIGS. 14-16). More specifically, when the occupant pushes the push acceptance portion 20 of the button 12, the resulting force 186 causes the shaft 22 of the button 12 to move within the aperture 30 of the button support member 28 of the support structure 18. The shaft 22, in turn, causes the cam-contacting surface 40 at the terminal portion 36 of the button 12 to contact the button contacting portion 42 of the cam 14 and thus rotate the cam 14 about the axle 56 to the rotated position 190 such that the button contacting portion 42 moves toward the rod 16. The button spring 32 becomes energized (in this embodiment, compressed) (compare FIG. 2 with FIG. 15). The first cam spring 168 and the second cam spring 170 become energized. For example, tab 158 maintains the lateral end 174 of the first cam spring 168 in position, while the rotation of the first finger 48 moves the spring tab 58 and the adjacent medial end 172 of the first cam spring 168 with it, energizing the first cam spring 168.

Further, as the cam 14 transitions from the un-rotated position 188 to the rotated position 190, the first finger 48 of the cam 14 interacts with the first grooved section 84 of the rod 16, and the second finger 50 of the cam 14 interacts with the second grooved section 88 of the rod 16, to cause the rod 16 to transition from an extended position 192 (see FIGS. 1-13) to a retracted position 194 (see FIG. 14-16). In other words, the rod 16 has, and can transition to, from, and between, the extended position 192 and a retracted position 194 relative to the support structure 18. In the retracted position 194, the chamfered end 80 of the rod 16 is closer to the aperture 150 of the second rod support member 146 than in the extended position 192. In the retracted position 194, the collar 78 of the rod 16 is further away from the aperture 150 of the second rod support member 146 than in the extended position 192. More specifically, the first edge 68 of the first finger 48 applies a force on (pushes) the first cam-contacting surface 92 of the first grooved section 84 of the rod 16, causing the rod 16 to move to the retracted position 194, with the rod 16 sliding within the aperture 148 of the first rod support member 144 and the aperture 150 of the second rod support member 146. Similarly, the first edge 72 of the second finger 50 applies a force on (pushes) the first cam-contacting surface 118 of the second grooved section 88 of the rod 16, also causing the rod 16 to move to the retracted position 194. In an alternative embodiment where the other end 167 of the rod spring 162 is attached to the rod 16, the rod spring 162 becomes energized. Thus, when the button 12 is in the depressed position 184, the cam 14 is in the rotated position 190, and the rod 16 is in the retracted position 194.

Further, when the button 12 is in the depressed position 184, the button spring 32, the first cam spring 168, and the second cam spring 170 are all energized, biasing the button 12 to return to the undepressed position 34, the cam 14 to the un-rotated position 188, and the rod 16 to the extended position 192. Therefore, when the occupant no longer applies the force 186 to the button 12 forcing the button 12 to the depressed position 184, the button spring 32, the first cam spring 168, and the second cam spring 170 force the button 12 back to the undepressed position 34, the cam 14 to the un-rotated position 188, and the rod 16 to the extended position 192. More specifically, when the occupant no longer applies the force 186 to the button 12, the second edge 70 of the first finger 48 pushes the second cam-contacting surface 106 of the first grooved section 84 of the rod and the second edge 74 of the second finger 50 pushes the second cam-contacting surface 126 of the second grooved section 88 of the rod 16. In the alternative embodiment where the other end 167 of the rod spring 162 is attached to the rod 16, when the button is in the depressed position 184, the rod spring 162 would additionally be energized and bias the button 12 to return to the undepressed position 34, the cam 14 to the un-rotated position 188, and the rod 16 to the extended position 192.

Figure 18:
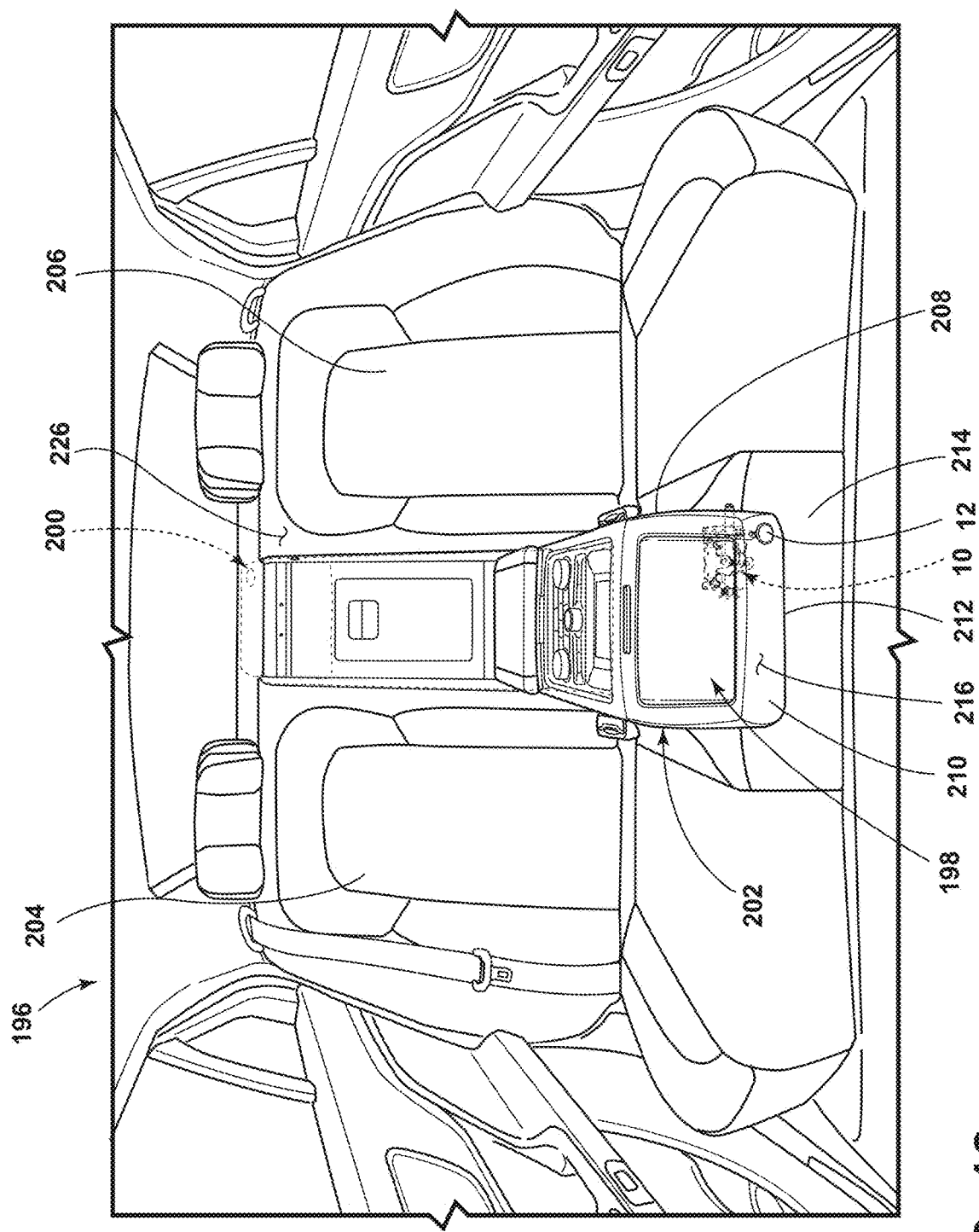
FIG. 18 is a front view of the armrest of FIG. 17 in a folded position over a seat, after the armrest has pivoted from the upright position shown in phantom.
Figure 19:
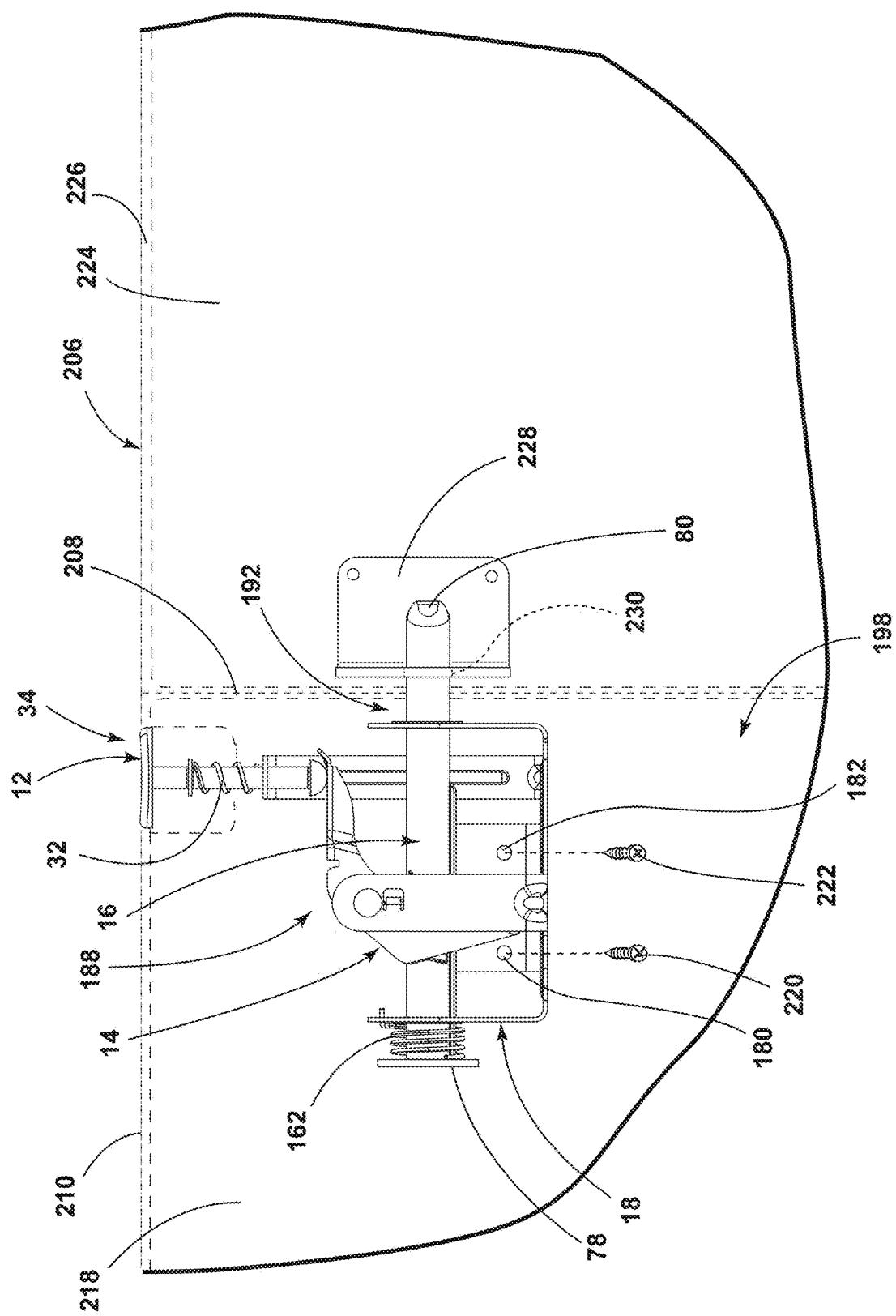
FIG. 19 is a front view of the support structure of the lock attached to a structural support below an exterior surface of the armrest of FIG. 17 and the rod is in the extended position extending through the aperture of the bracket attached within the adjacent seatback.
Figure 20:
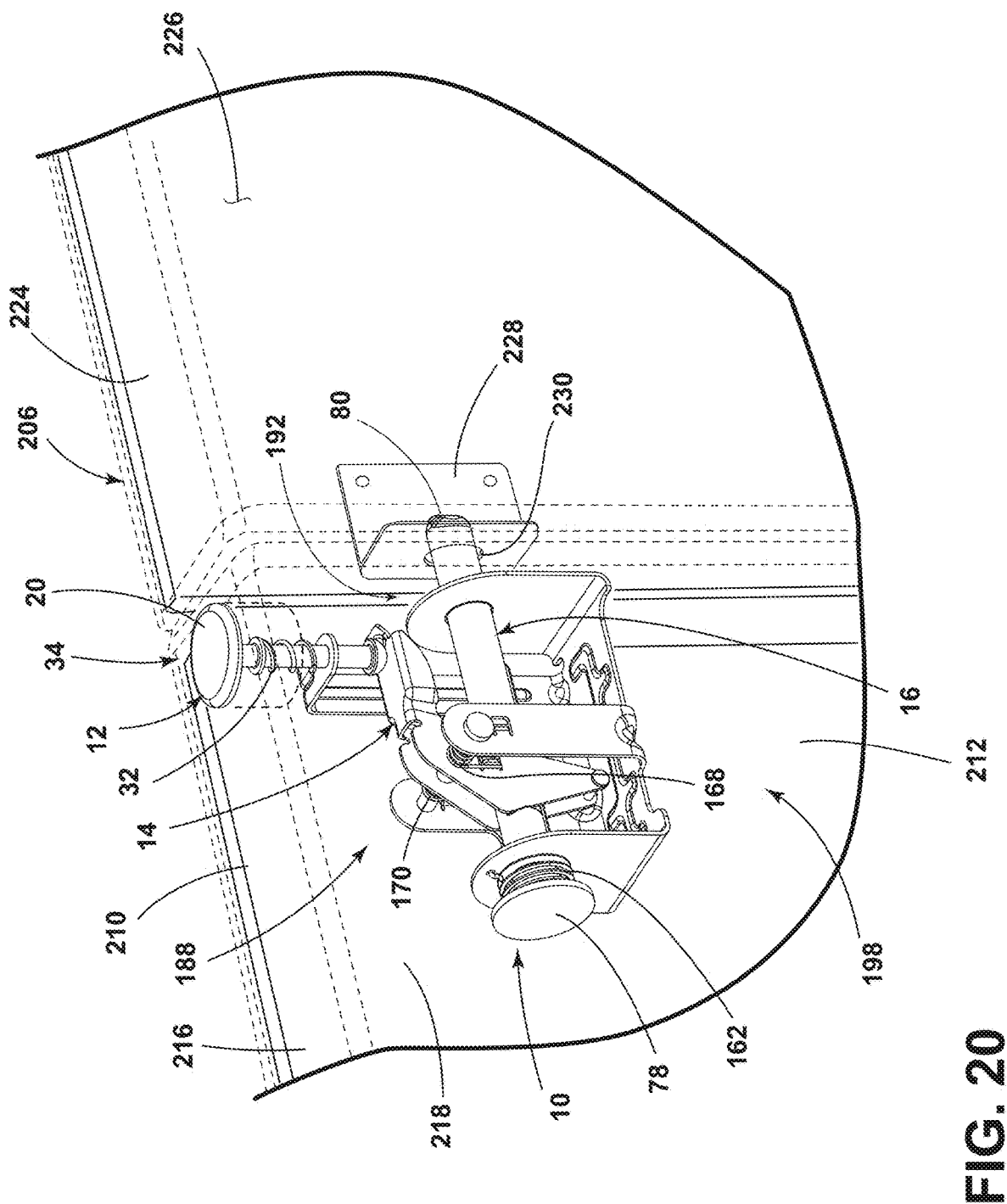
FIG. 20 is a perspective view of the support structure of the lock attached to a structural support within the armrest of FIG. 17 and the rod is in the extended position extending through the aperture of the bracket attached within the adjacent seatback.

Referring now to FIGS. 17-22, the pivoting member in a vehicle 196 to which the lock 10 is attached is an armrest 198. The armrest 198 has, and is capable of pivoting to, from, and between, an upright position 200 (FIG. 17) and a folded position 202 (FIG. 18). In the upright position 200, the armrest 198 is positioned relatively vertically and is adjacent and between seatback 204 and seatback 206. More specifically, in this embodiment, the armrest 198 includes a side 208, a top 210, and a front 212. The side 208, including the side 208 near the top 210, abuts the seatback 206 when the armrest 198 is in the upright position 200. In the folded position 202, the armrest 198 has pivoted so that it is positioned relatively horizontally and the front 212 is disposed over a middle seat 214.

The armrest 198 includes an exterior surface 216. The exterior surface 216 can be that surface provided by a layer of fabric, such as leather or cloth, or a rigid material such as wood, metal, or plastic, or a combination of fabric and rigid material. The armrest 198 further includes a structural support 218. In some embodiments, the structural support 218 may additionally provide the exterior surface 216. The lock 10 is attached to the structural support 218 of the armrest 198. In this embodiment, a fastener 220 is disposed through aperture 180 of the support structure 18 of the lock 10 and an aperture (not shown) in the structural support 218 of the armrest 198, which fastens the lock 10 to the structural support 218 of the armrest 198. Similarly, a fastener 222 is disposed through aperture 182 of the support structure 18 of the lock 10 and aperture (not shown) in the structural support 218 of the armrest 198, which fastens the lock 10 to the structural support 218 of the armrest 198. The cam 14 is disposed below the exterior surface 216 and is not accessible from outside the exterior surface 216. The button 12, as discussed above, manipulates the cam 14 when depressed, because the cam 14 abuts the button 12. The cam 14 abuts the button 12 below the exterior surface 216.

The push acceptance portion 20 of the button 12 is available for manipulation from the exterior surface 216. In other words, the exterior surface 216 does not cover the push acceptance portion 20 of the button 12, which would prevent an occupant from manipulating (in this embodiment, pushing) the push acceptance portion 20 of the button 12. The push acceptance portion 20 can rise slightly above exterior surface 216 or can be relatively contiguous with the exterior surface 216. In some embodiments, the push acceptance portion 20 can be recessed relative to the exterior surface 216 but still available for manipulation from the exterior surface 216. In this embodiment, the push acceptance portion 20 of the button 12 is disposed at the top 210 of the armrest 198. However, the push acceptance portion 20 of the button 12 could also be disposed at the front 212 of the armrest 198, by changing the orientation of the lock 10 with the armrest 198 and attaching the support structure 18 to a different area of the structural support 218 of the armrest 198.

In addition, at least a portion of the rod 16 projects past the exterior surface 216 of the armrest 198, when the rod 16 is in the extended position 192. In this embodiment, at least a portion of the rod 16 projects past the exterior surface 216 in the extended position 192 at the side 208 of the armrest 198. This allows the rod 16 to project into the adjacent seatback 206, when the armrest 198 is in the upright position 200, locking the armrest 198 in the upright position 200 (see particularly FIGS. 19-20), until an occupant manipulates the button 12 to the depressed position 184 (see particularly FIGS. 21-22). In other words, when the armrest 198 is in the upright position 200, the lock 10 prevents the armrest 198 from pivoting to the folded position 202 unless the button 12 is in the depressed position 184. In this embodiment, the seatback 206 includes, or is adjacent to, a back panel 224 beneath an exterior surface 226 of the seatback 206. A locking bracket 228 is attached to the back panel 224. The locking bracket 228 includes an aperture 230 to receive the rod 16 of the lock 10. When the armrest 198 is in the upright position 200, and the button 12 is in the undepressed position 34, a portion of the rod 16 (including the chamfered end 80) projects beyond the exterior surface 216 of the armrest 198, under the exterior surface 226 of the seatback 206, and into the aperture 230 of the locking bracket 228. Thus, unless the button 12 is manipulated to the depressed position 184, the locking bracket 228 prevents a pivoting force applied to the armrest 198 from actually pivoting the armrest 198 to the folded position 202.

Figure 21:
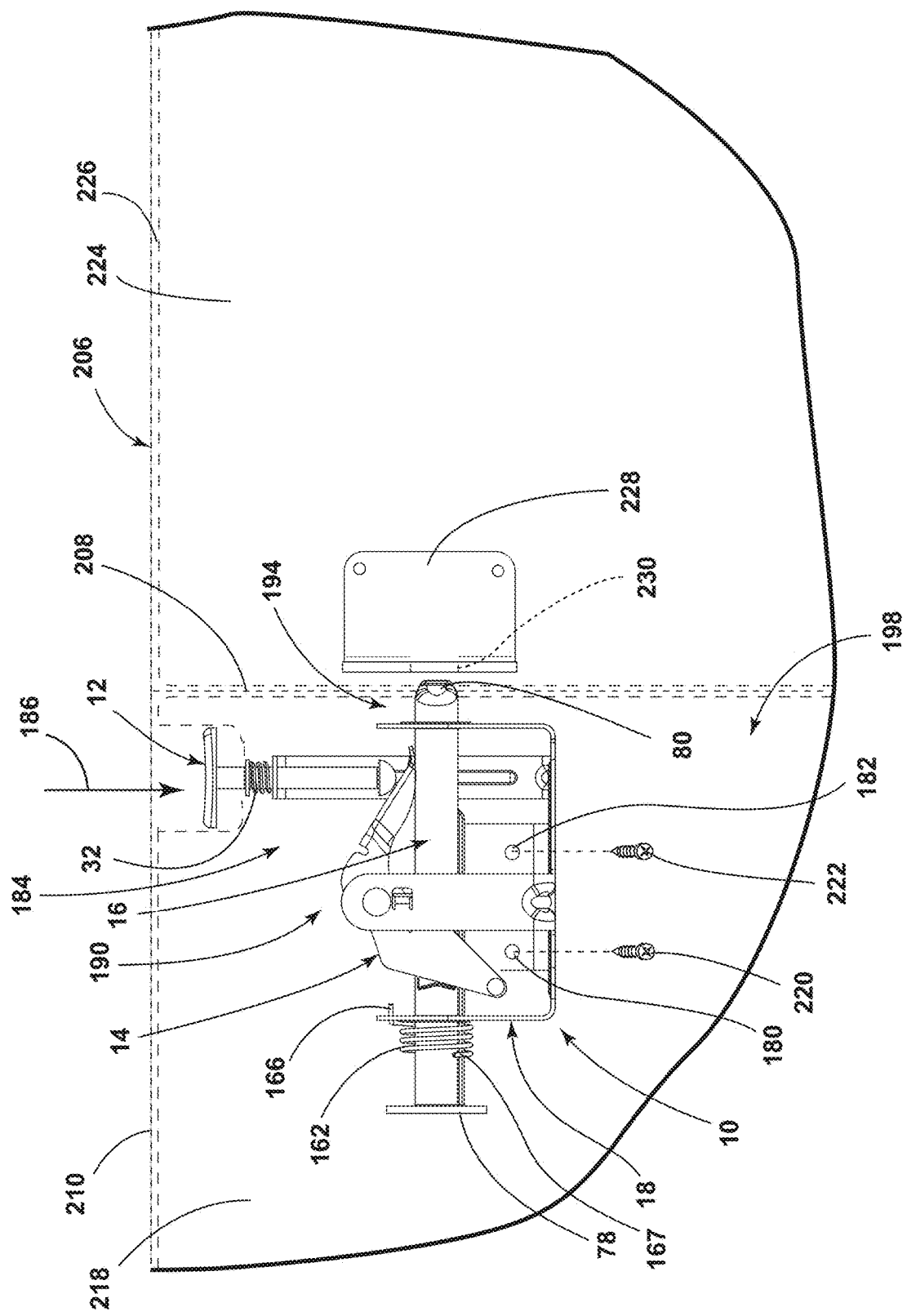
FIG. 21 is a front view of the lock attached to the armrest of FIG. 17, as in FIG. 19, but with the force forcing the button to the depressed position and the rod to the retracted position no longer extending through the aperture of the bracket in the adjacent seatback.
Figure 22:
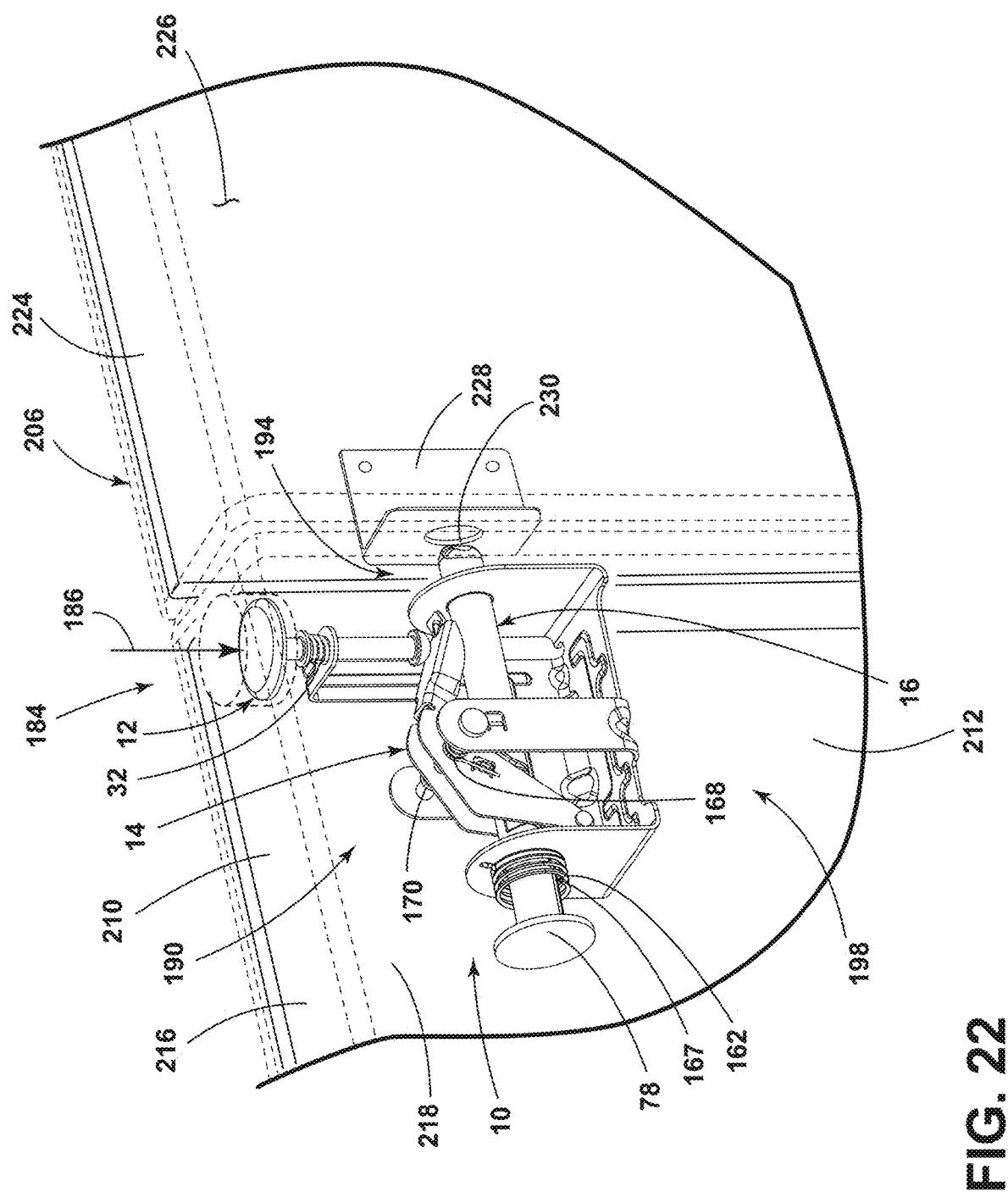
FIG. 22 is a perspective view of the lock attached to the armrest of FIG. 17, as in FIG. 20, but with the force forcing the button to the depressed position and the rod to the retracted position no longer extending through the aperture of the bracket in the adjacent seatback.
Figure 23:
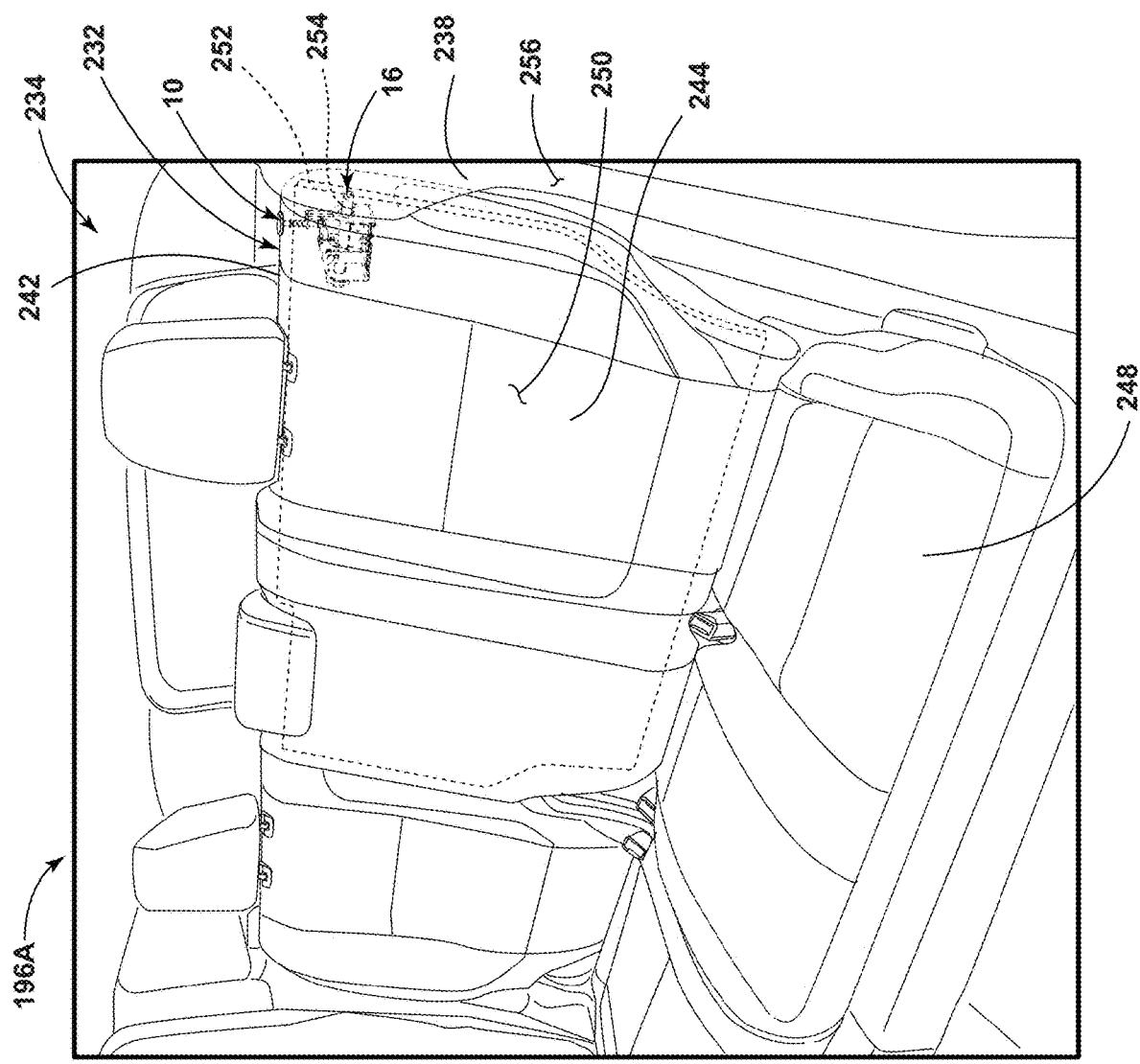
FIG. 23 is a perspective view of the lock of FIG. 1 attached to a seatback with the rod of the lock extending through an aperture in an adjacent interior paneling of a vehicle, locking the seatback in an upright position.

When the occupant applies force 186 to manipulate the button 12 to the depressed position 184, as explained above, the cam 14 transitions from the un-rotated position 188 (see particularly FIGS. 19 and 20) to the rotated position 190 (see particularly FIGS. 21 and 22). As the cam 14 transitions from the un-rotated position 188 to the rotated position 190, the cam 14 interacts with the rod 16 to cause the rod 16 to transition from the extended position 192 (see particularly FIGS. 19 and 20) to the retracted position 194 (see particularly FIGS. 21 and 22). The cam 14 interacts with the rod 16 below the exterior surface 216 of the armrest 198. More specifically, as explained previously, among other things, as the cam 14 transitions from the un-rotated position 188 to the rotated position 190, the first finger 48 of the cam 14 interacts with the first grooved section 84 of the rod 16 to cause the rod 16 to transition from the extended position 192 to the retracted position 194, and the rod 16 slides within the aperture 148 of the first rod support member 144. Because the rod 16 is in the retracted position 194, the rod 16 is no longer within the aperture 230 of the locking bracket 228 of the seatback 206. Therefore, the armrest 198 can be pivoted to the folded position 202. At least a portion of the rod 16 is disposed below the exterior surface 216 of the armrest 198 in both the extended position 192 and the retracted position 194, such as the collar 78 of the rod 16.

As discussed above, the lock 10 further includes at least one spring biasing the button 12 to the undepressed position 34, the cam 14 to the un-rotated position 188, and the rod 16 to the extended position 192. The at least one spring is disposed below the exterior surface 216 of the armrest 198. Therefore, after the occupant has manipulated the button 12 to the depressed position 184 and pivoted the armrest 198 far enough toward the folded position 202 so that the rod 16 has cleared the seatback 206, the occupant can stop manipulating the button 12 to the depressed position 184. The button spring 32, the first cam spring 168, and the second cam spring 170, while the button 12 is in the depressed position 184, bias the button 12 back to the undepressed position 34, the cam 14 back to the un-rotated position 188, and the rod 16 back to the extended position 192. The button spring 32, the first cam spring 168, and the second cam spring 170 are all disposed beneath the exterior surface 216 of the armrest 198, as is the support structure 18.

Figure 24:
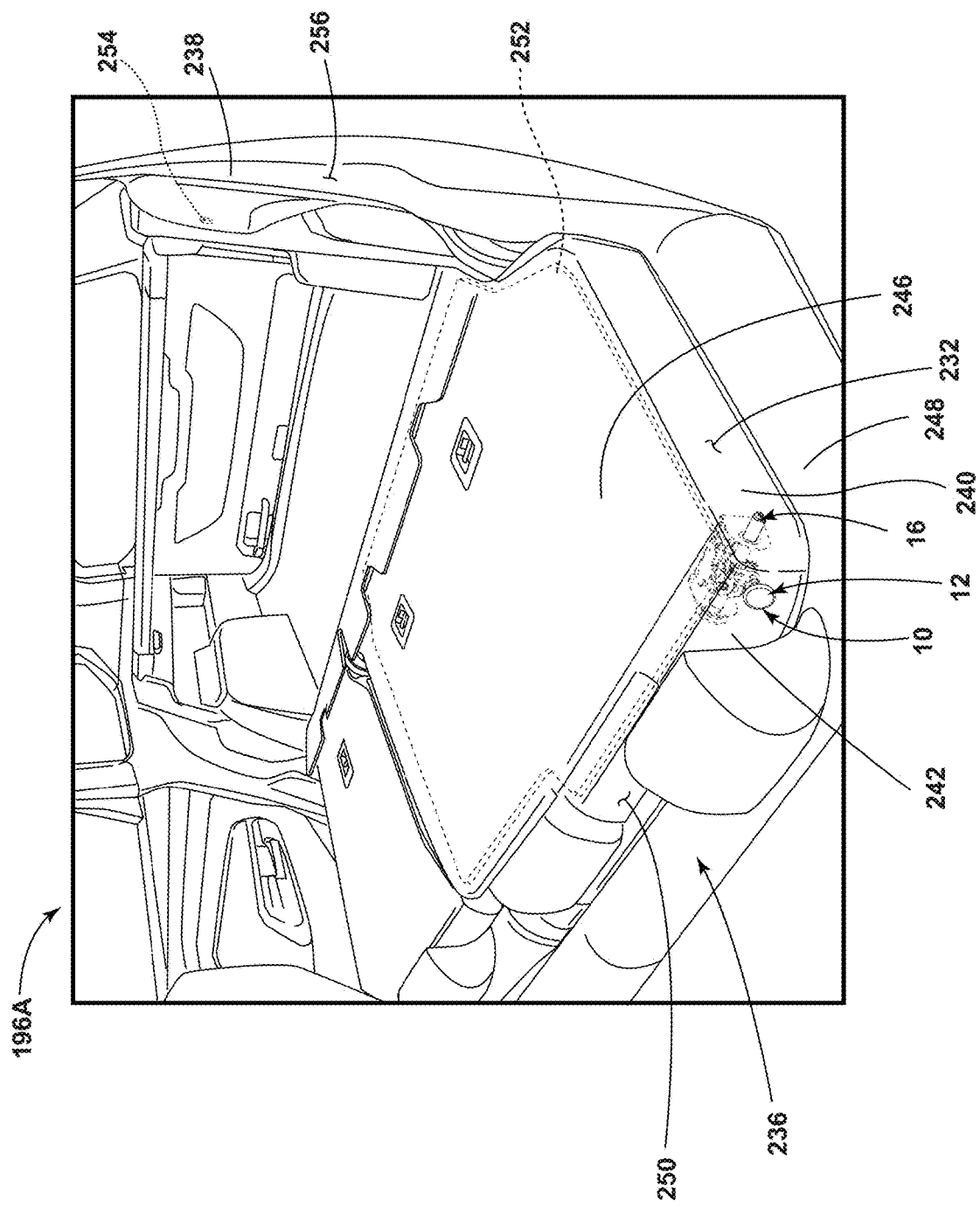
FIG. 24 is a perspective view of the seatback of FIG. 23 in a folded position, with the rod of the lock attached within the seatback no longer extending through the aperture of the adjacent interior paneling.
Figure 25:
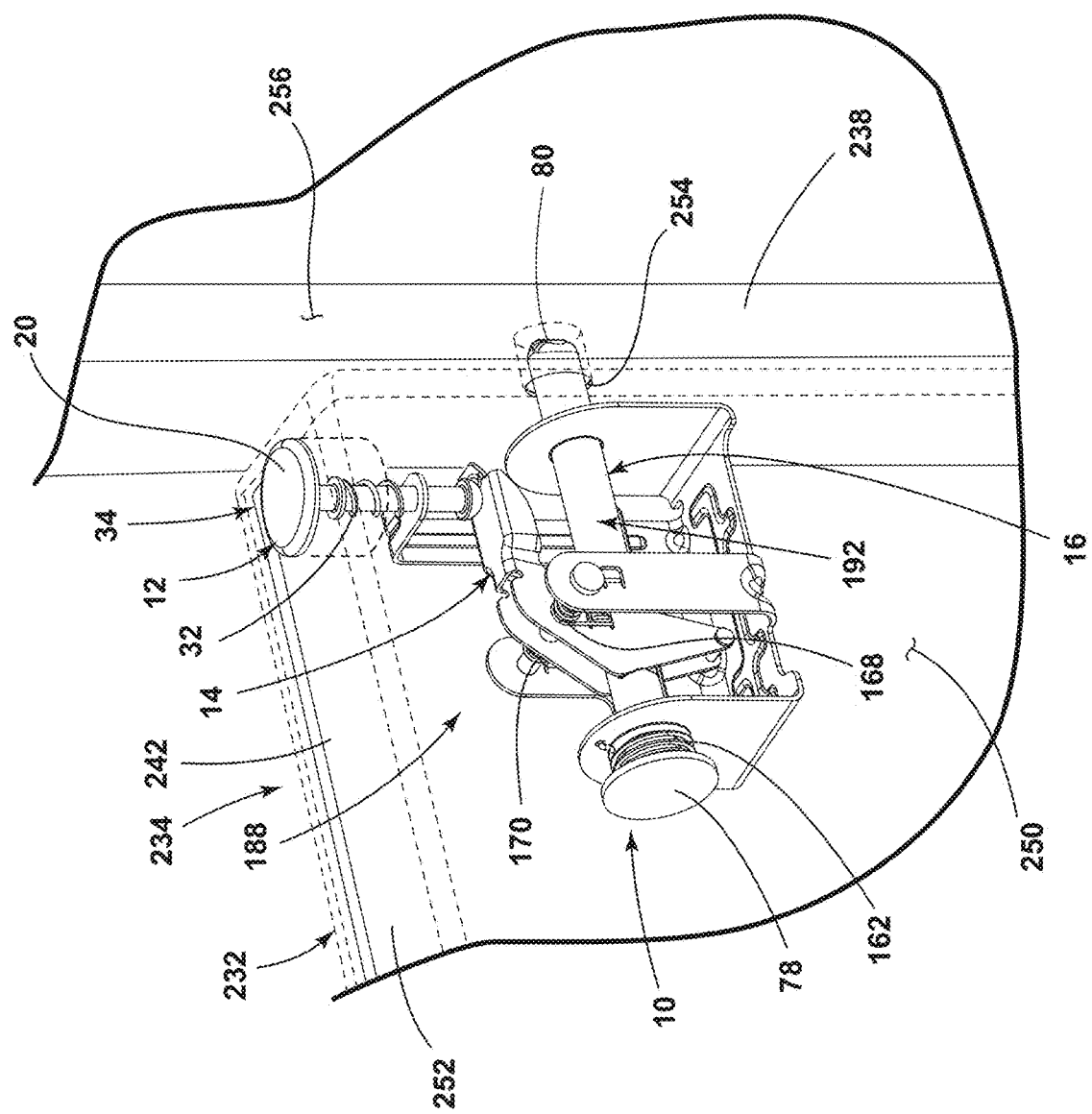
FIG. 25 is a perspective view of the seatback of FIG. 23, with the seatback in phantom, showing the lock attached to a structural support of the seatback and the rod in the extended position projecting into an aperture of the adjacent interior paneling.

Referring now to FIGS. 23-27, the pivoting member of a vehicle 196A, to which the lock 10 is attached, and locks in place, is a seatback 232. The seatback 232 is capable of pivoting between an upright position 234 (FIG. 23) and a folded position 236 (FIG. 24). In the upright position 234, the seatback 232 is positioned relatively vertically and is adjacent interior paneling 238 of the vehicle 196A. More specifically, in this embodiment, the seatback 232 includes a side 240, a top 242, a front 244, and a rear 246 opposite the front 244. The side 240, including the side 240 near the top 242, abuts the interior paneling 238 of the vehicle 196A when the seatback 232 is in the upright position 234. In the folded position 236, the seatback 232 has pivoted so that it is positioned relatively horizontally and at least a portion of the front 244 may be disposed over a seat 248.

The seatback 232 includes an exterior surface 250. The exterior surface 250 can be that surface provided by a layer of fabric, such as leather or cloth, or a rigid material such as wood, metal, or plastic, or a combination of fabric and rigid material. The seatback 232 further includes a structural support 252. In some embodiments, the structural support 252 may provide the exterior surface 250. The lock 10 is attached to the structural support 252, in the same manner described above for the armrest 198. As with the armrest 198 above, the cam 14 is disposed below the exterior surface 250 and is not accessible from outside the exterior surface 250. The button 12, as discussed above, manipulates the cam 14 when depressed, because the cam 14 abuts the button 12. The cam 14 abuts the button 12 below the exterior surface 250 of the seatback 232.

As with the armrest 198 above, the push acceptance portion 20 of the button 12 is available for manipulation from the exterior surface 250 of the seatback 232. In other words, the exterior surface 216 does not cover the push acceptance portion 20 of the button 12, which would prevent the occupant from manipulating (in this embodiment, pushing) the push acceptance portion 20 of the button 12. The push acceptance portion 20 can rise slightly above exterior surface 250 of the seatback 232 or can be relatively contiguous with the exterior surface 250. In some embodiments, the push acceptance portion 20 can be recessed relative to the exterior surface 250 but still available for manipulation from the exterior surface 250. In this embodiment, the push acceptance portion 20 of the button 12 is disposed at the top 242 of the seatback 232. However, the push acceptance portion 20 of the button 12 could also be disposed at the front 244 of the seatback 232 or the rear 246 of the seatback 232.

As with the armrest 198 above, at least a portion of the rod 16 projects past the exterior surface 250 of the seatback 232, when the rod 16 is in the extended position 192. In this embodiment, at least a portion of the rod 16 projects past the exterior surface 250 in the extended position 192 at the side 240 of the seatback 232. This allows the rod 16 to project into an aperture 254 within the adjacent interior paneling 238, when the seatback 232 is in the upright position 234 (see particularly FIG. 25), locking the seatback 232 in the upright position 234, until an occupant manipulates the button 12 to the depressed position 184 (see particularly FIG. 26). In other words, when the seatback 232 is in the upright position 234, the lock 10 prevents the seatback 232 from pivoting to the folded position 236 unless the button 12 is in the depressed position 184. In this embodiment, the interior paneling 238 includes the aperture 254 recessed into or surrounded by the exterior surface 256 of the interior paneling 238. The aperture 254 of the interior paneling 238 receives the rod 16 of the lock 10. When the seatback 232 is in the upright position 234, and the button 12 is in the undepressed position 34 (FIG. 25), a portion of the rod 16 (including the chamfered end 80) projects beyond the exterior surface 250 of the seatback 232 into the aperture 254 of the interior paneling 238. Thus, unless the button 12 is manipulated to the depressed position 184, the aperture 254 of the interior paneling 238 prevents a pivoting force applied to the seatback 232 from actually pivoting the seatback 232 to the folded position 236.

Figure 26:
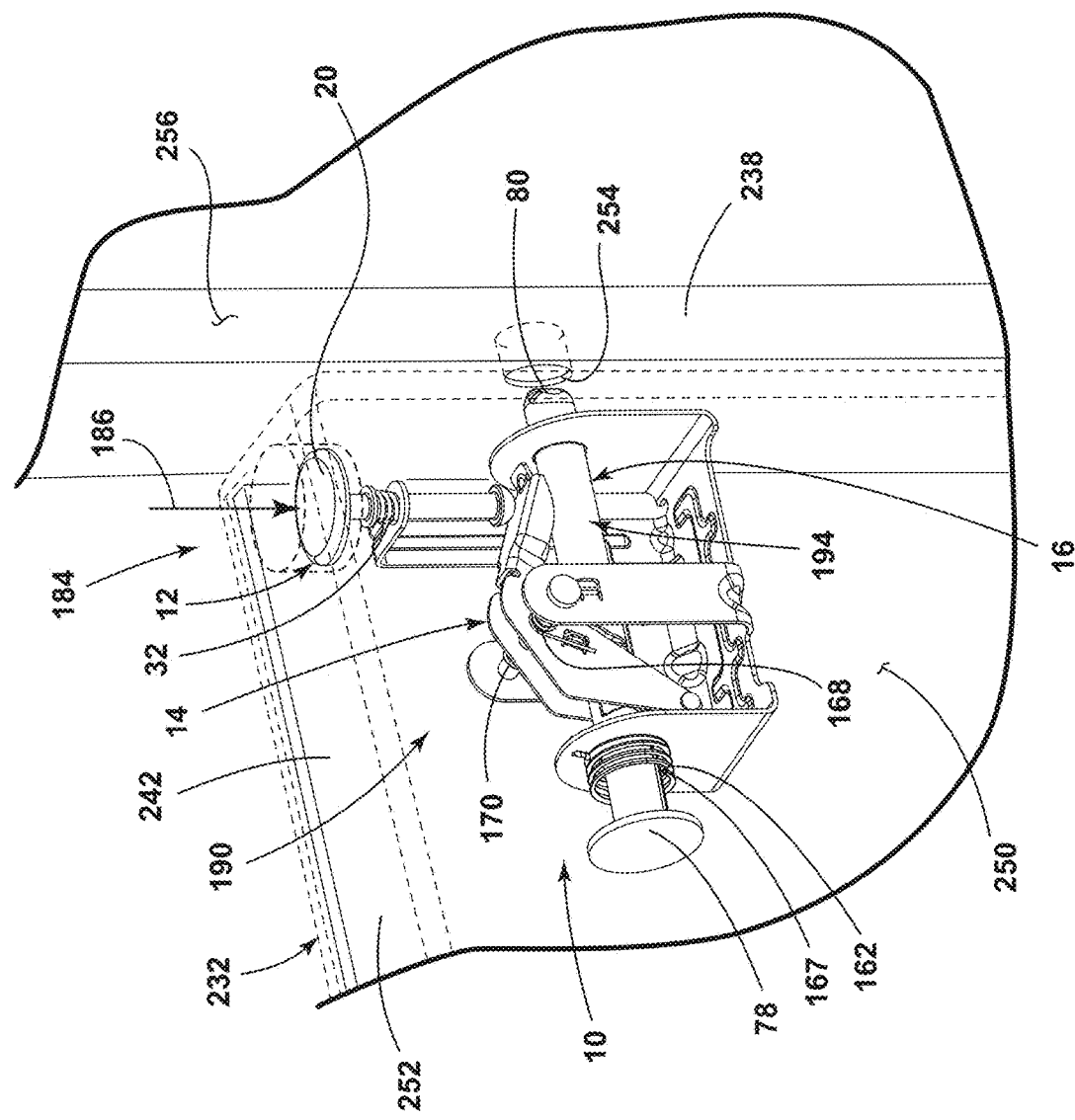
FIG. 26 is a perspective view of the seatback of FIG. 23, with the button in the depressed position causing the rod to move to the retracted position not projecting into the aperture of the interior paneling.
Figure 27:
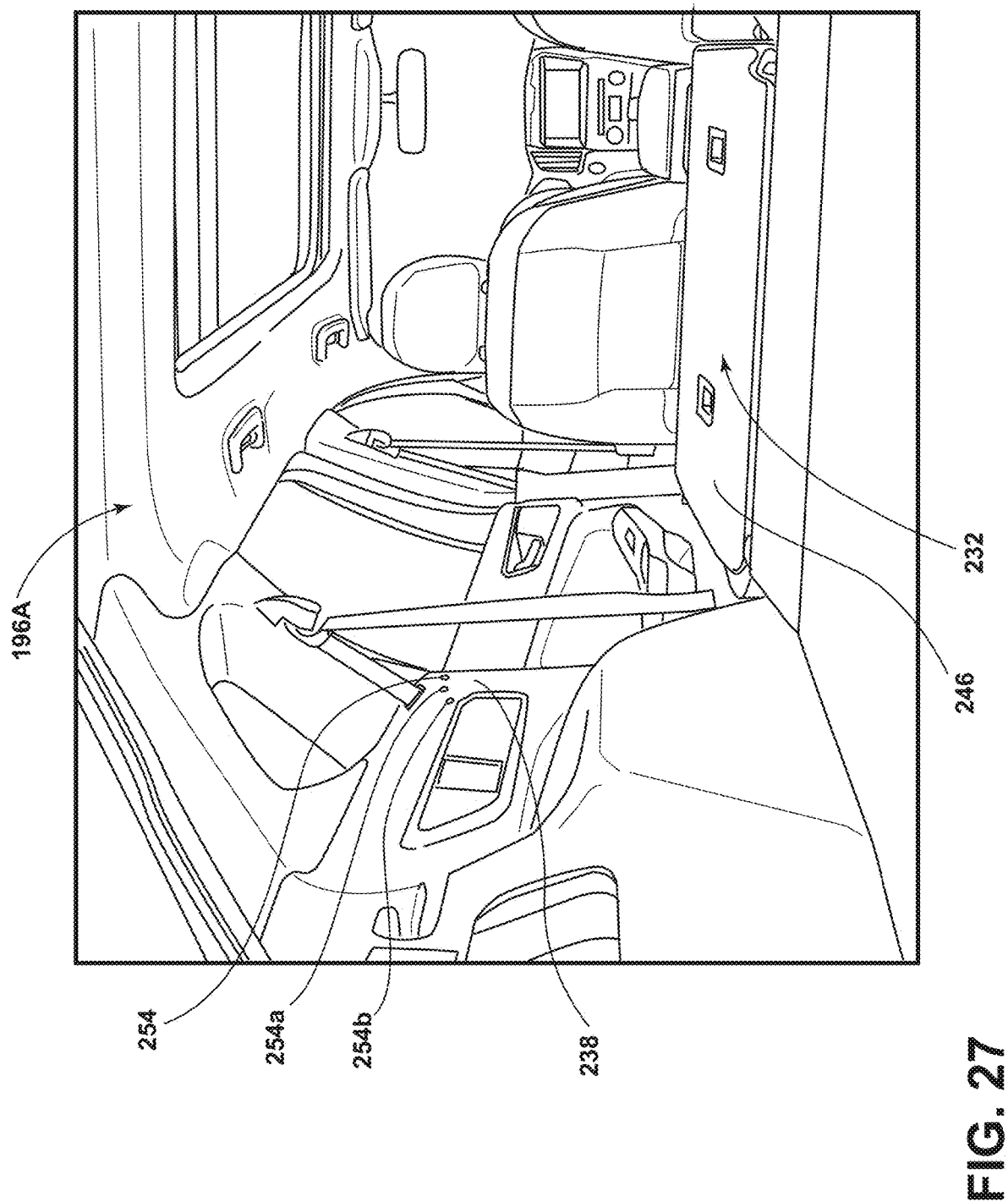
FIG. 27 is a perspective view of the vehicle of FIG. 23, illustrating additional apertures in the interior paneling, into which the rod of the lock attached to the seatback can project, allowing the pivoting seatback to lock into place at a variety of angles.
Figure 28:
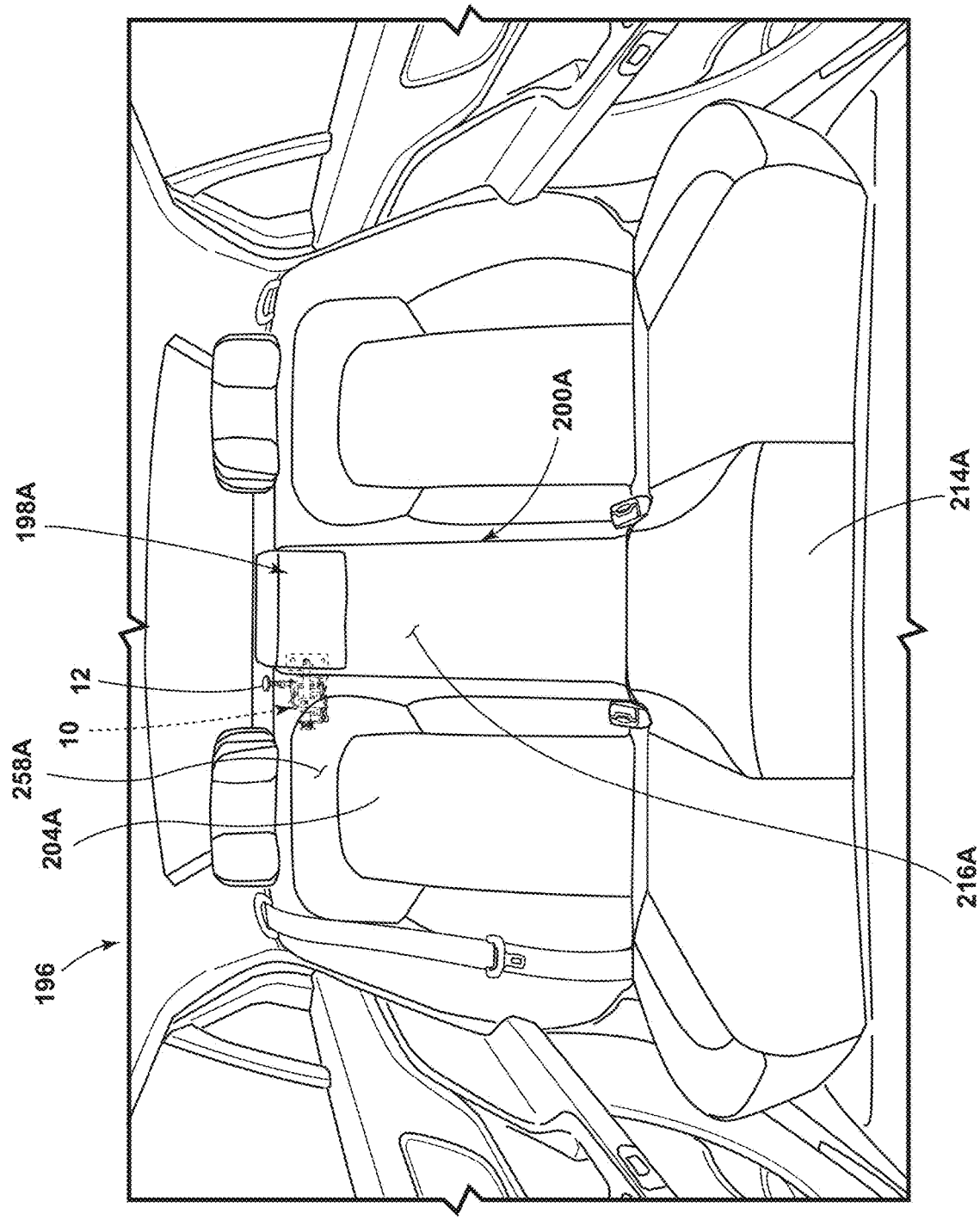
FIG. 28 is a perspective view of another embodiment of the vehicle of FIG. 17, illustrating the lock attached within a seatback with the rod in an extended position projecting into an adjacent armrest, to lock the armrest in the upright position.
Figure 29:
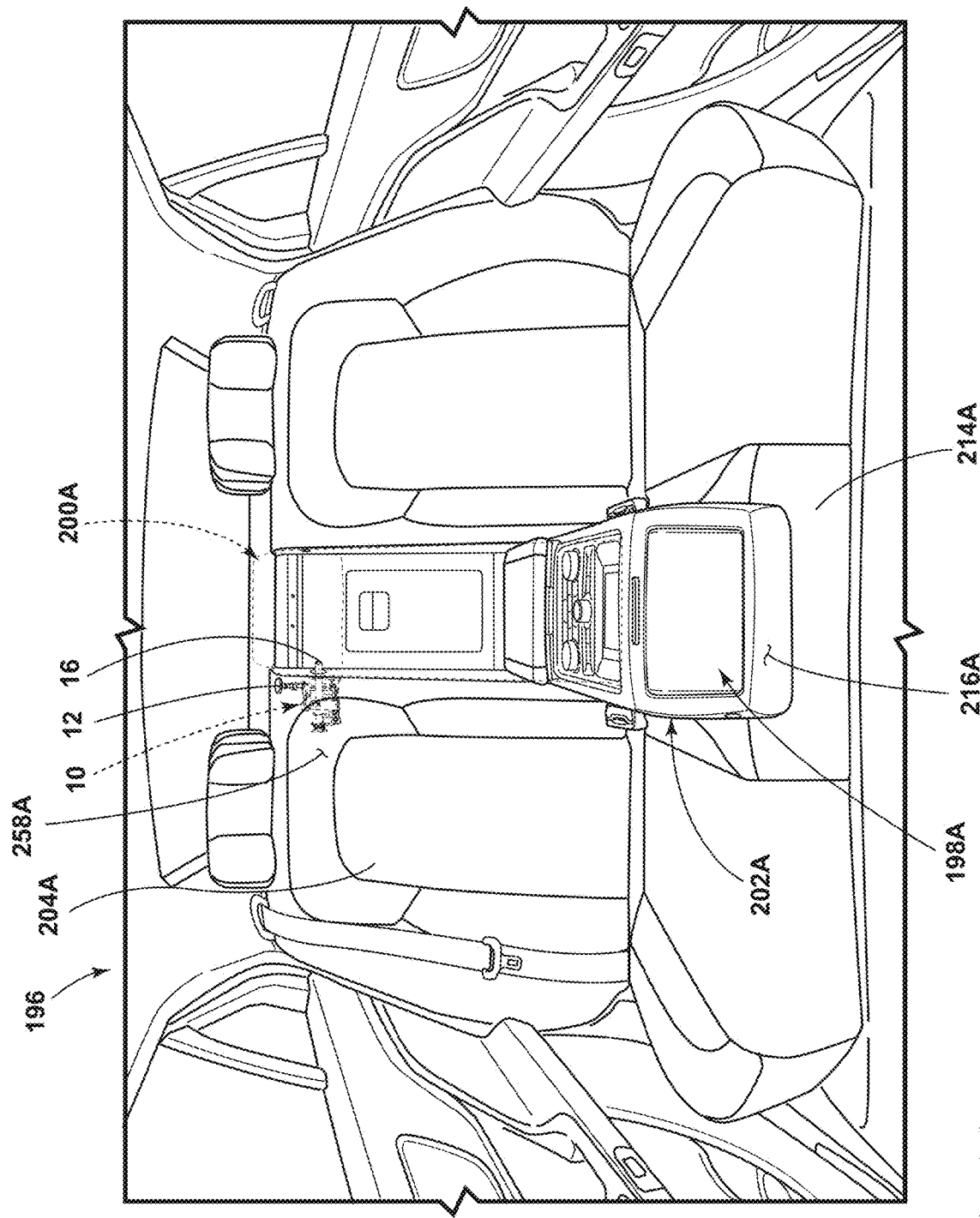
FIG. 29 is a perspective view of the embodiment of FIG. 28, illustrating the armrest in the folded positions.
Figure 30:
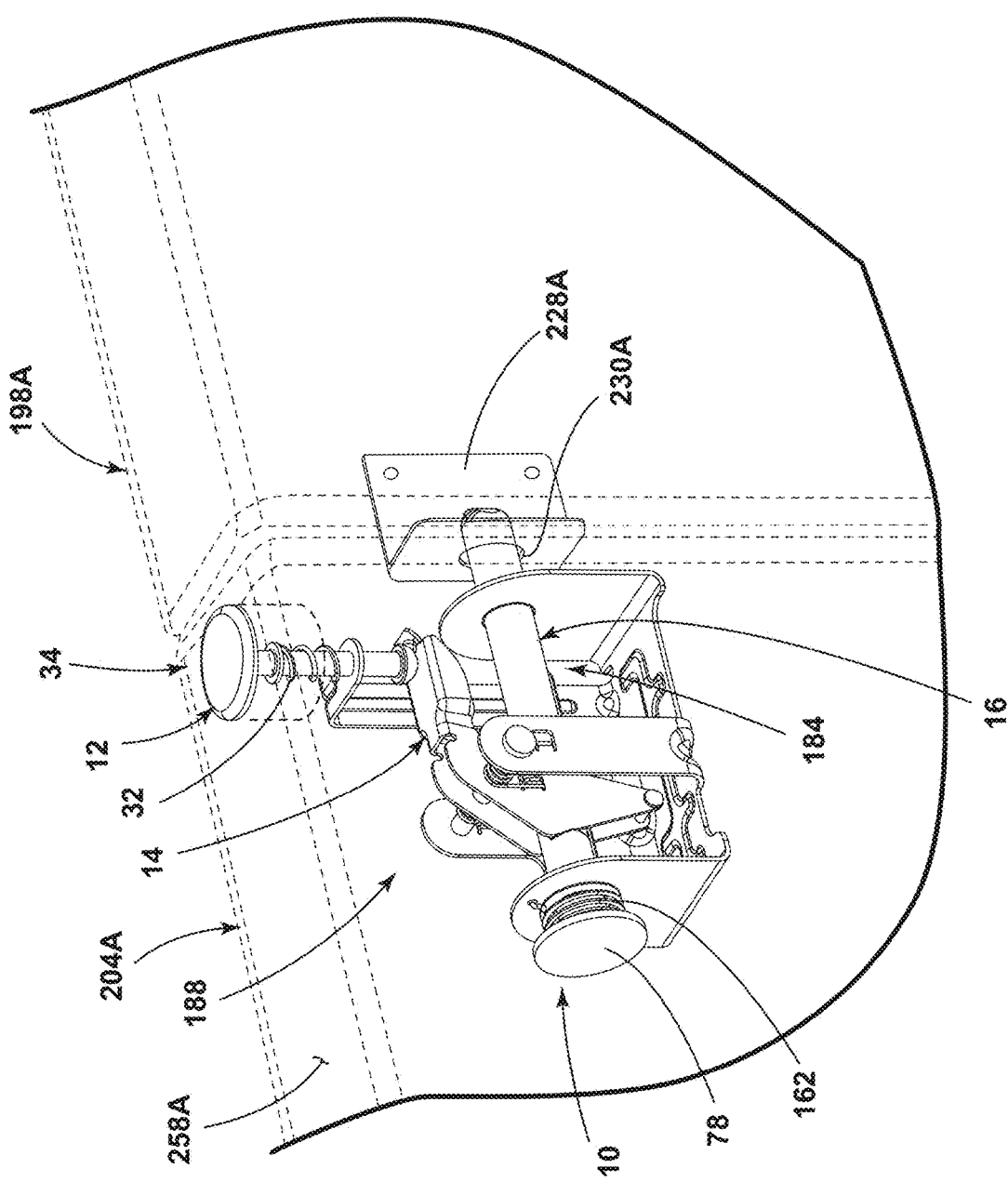
FIG. 30 is a perspective view of the embodiment of FIG. 28, with the lock attached to a structural support of the seatback and the rod in the extended position projecting into an aperture of a bracket attached within the armrest, locking the armrest in the upright position.
Figure 31:
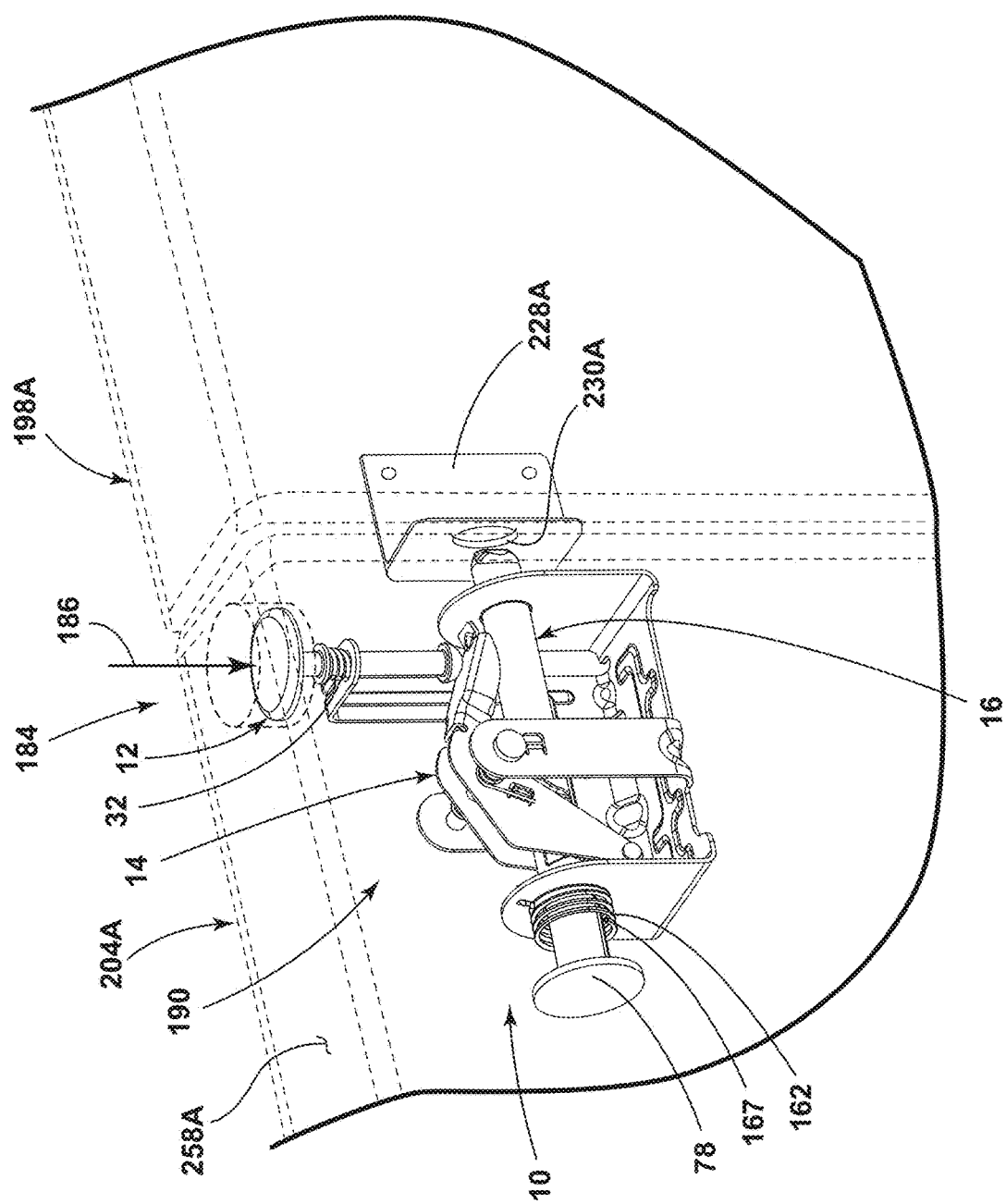
FIG. 31 is a perspective view of the embodiment of FIG. 28, with the force forcing the button of the lock to the depressed position and thus the rod to the retracted position out of the aperture of the bracket of the armrest, allowing the armrest to pivot to the folded position.

When an occupant manipulates the button 12 to the depressed position 184 with force 186, as explained above, the cam 14 transitions from the un-rotated position 188 (see particularly FIG. 25) to the rotated position 190 (see particularly FIG. 26). As the cam 14 transitions from the un-rotated position 188 to the rotated position 190, the cam 14 interacts with the rod 16 to cause the rod 16 to transition from the extended position 192 (see particularly FIG. 25) to the retracted position 194 (see particularly FIG. 26). The cam 14 interacts with the rod 16 below the exterior surface 250 of the seatback 232. More specifically, as explained previously, among other things, as the cam 14 transitions from the un-rotated position 188 to the rotated position 190, the first finger 48 of the cam 14 interacts with the first grooved section 84 of the rod 16 to cause the rod 16 to transition from the extended position 192 to the retracted position 194, and the rod 16 slides within the aperture 148 of the first rod support member 144. Because the rod 16 is in the retracted position 194, the rod 16 is no longer within the aperture 254 of the interior paneling 238. Therefore, the seatback 232 can be pivoted to the folded position 236. At least a portion of the rod 16 is disposed below the exterior surface 250 of the seatback 232 in both the extended position 192 and the retracted position 194, such as the collar 78 of the rod 16.

As discussed above, the lock 10 further includes at least one spring biasing the button 12 to the undepressed position 34, the cam 14 to the un-rotated position 188, and the rod 16 to the extended position 192. The at least one spring is disposed below the exterior surface 250 of the seatback 232. Therefore, after the occupant has manipulated the button 12 to the depressed position 184 and pivoted the seatback 232 far enough toward the folded position 236 so that the rod 16 has cleared the aperture 254 of the interior paneling 238, the occupant can stop manipulating the button 12 to the depressed position 184. The button spring 32, the first cam spring 168, and the second cam spring 170, bias the button 12 back to the undepressed position 34, the cam 14 back to the un-rotated position 188, and the rod 16 back to the extended position 192. The button spring 32, the first cam spring 168, and the second cam spring 170 are all disposed beneath the exterior surface 250 of the seatback 232. In some embodiments, the vehicle 196A may include more than one aperture 254, for example apertures 254a and 254b (see FIG. 27). The lock 10 can utilized to insert the rod 16 into any of such apertures 254, 254a, and 254b, to lock the seatback 232 in the upright position 234 one of a variety of different angles relative to the seat 248. Moreover, in some embodiments, the vehicle 196A may not include interior paneling 238 and, instead, have an exposed vehicle body frame. In such an embodiment, the aperture 254 (as well as any included additional apertures, such as apertures 254a and 254b) will be disposed in the vehicle body frame and the rod 16 will interact with the aperture 254 in the manner described above.

It should be understood from the foregoing that the lock 10 can be incorporated into any pivoting member of a vehicle to fix the pivoting member in place, and is not limited to use in conjunction with a seatback or an armrest. In addition, it should be understood from the foregoing that the support structure 18 of the lock 10 can take different shapes and forms to accommodate the pivoting member to which the lock 10 is attached.

Finally, it should be understood that the lock 10 need not be located within the pivoting member of the vehicle to be "for a pivoting member in a vehicle," as used in the claims. Rather, the lock 10 can be attached to a fixed component of the vehicle, and the pivoting member includes an aperture to receive the rod 16 when the rod 16 is in the extended position 192. For example, as illustrated in FIGS. 28-31, the lock 10 for pivoting member armrest 198A of vehicle 196 is located beneath an exterior surface 258A of seatback 204A. When the armrest 198A is in the upright position 200A, the rod 16 extends into aperture 230A of locking bracket 228A disposed within the armrest 198A beneath an exterior surface 216A, locking the armrest 198A in the upright position 200A, unless the occupant manipulates the button 12 of the lock 10 to the depressed position 184, as explained above. To move the armrest 198A to the folded position 202A, the occupant applies the force 186 to the button 12 and the rod 16 moves to the retracted position 194, removing the rod 16 from the aperture 230A of the locking bracket 228A disposed within the armrest 198A, allowing the armrest 198A to pivot to the folded position 202A over seat 214A.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An armrest for a vehicle comprising:
   a structural support;
   an exterior surface; and
   a lock attached to the structural support, the lock comprising:
      a button including a push acceptance portion, a terminal portion, a shaft between the push acceptance portion and the terminal portion, a depressed position, and an undepressed position, the push acceptance portion being available for manipulation from the exterior surface;
      a cam rotatable about an axle and disposed beneath the exterior surface, the cam including a button contacting portion that contacts the terminal portion of the button, a first finger extending from a side of the button contacting portion, a second finger opposite the first finger extending from another side of the button contacting portion, an un-rotated position, and a rotated position; and
      a rod extending between the first finger and the second finger of the cam, the rod including an elongated shaft that terminates in an end, a first grooved section adjacent the first finger of the cam, a second grooved section adjacent the second finger of the cam, an extended position where at least a portion of the rod extends past the exterior surface, and a retracted position where less or none of the rod extends past the exterior surface;
   wherein, as the button moves from the undepressed position to the depressed position, the terminal portion of the button pushes the button contacting portion and causes the cam to rotate about the axle from the un-rotated position to the rotated position, and the first finger and the second finger of the cam interact with the first grooved section and the second grooved section respectively of the rod to withdraw the rod from the extended position to the retracted position.

2. The armrest of claim 1,
   the push acceptance portion of the button has a concavely contoured depressed surface.

3. The armrest of claim 1 further comprising:
   one or more springs disposed beneath the exterior surface that bias the button to the undepressed position, the cam to the un-rotated position, and the rod to the extended position.

4. The armrest of claim 1,
   the cam abuts the button below the exterior surface.

5. The armrest of claim 1,
   the push acceptance portion of the button is recessed relative to the exterior surface but still available for manipulation from the exterior surface.

6. The armrest of claim 1,
   the push acceptance portion of the button is at least relatively contiguous with the exterior surface.

7. A vehicle comprising:
   a pair of seatbacks;
   an armrest comprising:
      an upright position where the armrest is positioned relatively vertically and adjacent to and between the pair of seatbacks;
      a folded position where the armrest pivots so that it is positioned relatively horizontally;
      a structural support;
      an exterior surface; and a lock attached to the structural support, the lock comprising:
a button including a push acceptance portion, a terminal portion, a shaft between the push acceptance portion and the terminal portion, a depressed position, and an undepressed position, the push acceptance portion being available for manipulation from the exterior surface;
a cam rotatable about an axle and disposed beneath the exterior surface, the cam including a button contacting portion that contacts the terminal portion of the button, a first finger extending from a side of the button contacting portion, a second finger opposite the first finger extending from another side of the button contacting portion, an un-rotated position, and a rotated position; and
a rod extending between the first finger and the second finger of the cam, the rod including an elongated shaft that terminates in an end, a first grooved section adjacent the first finger of the cam, a second grooved section adjacent the second finger of the cam, an extended position where at least a portion of the rod extends past the exterior surface and into one of the seatbacks when the armrest is in the upright position so as to prevent the armrest from pivoting to the folded position, and a retracted position where the rod does not extend into the one of the seatbacks so as to not prevent the armrest from pivoting from the upright position to the folded position;
wherein, as the button moves from the undepressed position to the depressed position, the terminal portion of the button pushes the button contacting portion and causes the cam to rotate about the axle from the un-rotated position to the rotated position, and the first finger and the second finger of the cam interact with the first grooved section and the second grooved section respectively of the rod to withdraw the rod from the extended position to the retracted position.

8. The vehicle of claim 7,
the armrest further comprises a top from a perspective of when the armrest is in the upright position, and the button is disposed at the top.

9. The vehicle of claim 7,
in the folded position, the armrest is disposed over a middle seat.

10. The vehicle of claim 7,
the seatback of the pair of seatbacks into which the portion of the rod extends when the rod is in the extended position includes an exterior surface, a back panel, and a locking bracket attached to the back panel, the locking bracket including an aperture; and
when the rod is in the extended position and projects beyond the exterior surface of the armrest, beneath the exterior surface of the seatback, and into the aperture of the locking bracket, which prevents the armrest from moving from the upright position to the folded position.

11. The vehicle of claim 10,
when the button is manipulated to the depressed position, the rod is in the retracted position and does not extend into the aperture of the locking bracket of the seatback, allowing the armrest to be pivoted to the folded position.

12. The vehicle of claim 7,
the lock further includes one or more springs disposed beneath the exterior surface of the armrest that bias the button to the undepressed position, the cam to the un-rotated position, and the rod to the extended position.

13. The vehicle of claim 7,
the cam abuts the button below the exterior surface of the armrest.

14. The vehicle of claim 7,
the lock further includes a support structure that supports the button, the cam, and the rod, the support structure including one or more apertures; and
the armrest further includes one or more fasteners disposed through the one or more apertures and into the structural support of the armrest to fasten the lock to the structural support of the armrest.

15. A vehicle comprising:
a seatback comprising:
an exterior surface;
a structural support; and
a lock attached to the structural support, the lock comprising:
a button including a push acceptance portion, a terminal portion, a shaft between the push acceptance portion and the terminal portion, a depressed position, and an undepressed position, the push acceptance portion being available for manipulation from the exterior surface;
a cam rotatable about an axle and disposed beneath the exterior surface, the cam including a button contacting portion that contacts the terminal portion of the button, a first finger extending from a side of the button contacting portion, a second finger opposite the first finger extending from another side of the button contacting portion, an un-rotated position, and a rotated position; and
a rod extending between the first finger and the second finger of the cam, the rod including an elongated shaft that terminates in an end, a first grooved section adjacent the first finger of the cam, a second grooved section adjacent the second finger of the cam, an extended position where at least a portion of the rod extends past the exterior surface, and a retracted position where less or none of the rod extends past the exterior surface;
wherein, as the button moves from the undepressed position to the depressed position, the terminal portion of the button pushes the button contacting portion and causes the cam to rotate about the axle from the un-rotated position to the rotated position, and the first finger and the second finger of the cam interact with the first grooved section and the second grooved section respectively of the rod to withdraw the rod from the extended position to the retracted position.

16. The vehicle of claim 15 further comprising:
interior paneling including an aperture;
the seatback further includes an upright position where the seatback is positioned relatively vertically and adjacent to the interior paneling, and a folded position where the seatback is positioned relatively horizontally; and
when the seatback is in the upright position, and the button is in the undepressed position, the rod is in the extended position and a portion of the rod projects beyond the exterior surface of the seatback and into the aperture of the interior paneling thus preventing the seatback from moving to the folded position.

17. The vehicle of claim 16,
when the button is manipulated to the depressed position, the rod is in the retracted position and does not extend into the aperture of the interior paneling, allowing the seatback to be pivoted to the folded position.

18. The vehicle of claim 15 further comprising:
a seat positioned relative to the seatback such that when the seatback is in a folded position, the seatback is positioned relatively horizontally over the seat; and
interior paneling adjacent to the seatback when the seatback is in an upright position, the interior paneling including a plurality of apertures, each aperture positioned to receive the rod of the lock of the seatback when the seatback is at a particular angle relative to the seat;
   when the seatback is in the upright position, and the button is in the undepressed position, the rod is in the extended position and a portion of the rod projects beyond the exterior surface of the seatback and into one of the plurality of apertures of the interior paneling thus preventing the seatback from moving to the folded position or another angle relative to the seat when in the upright position.

19. The vehicle of claim 15 further comprising:
an armrest having an upright position where the armrest is disposed relatively vertically and adjacent to the seatback, a folded position where the armrest is disposed relatively horizontally over a seat, and a locking bracket disposed beneath an exterior surface;
   when the armrest is in the upright position, and the button of the lock is in the undepressed position, the rod of the lock extends from the seatback and into an aperture of the locking bracket, preventing the armrest from moving to the folded position.

20. The vehicle of claim 19,
movement of the button to the depressed position moves the rod to the retracted position and removes the rod from the aperture of the locking bracket disposed within the armrest, allowing the armrest to move to the folded position.

* * * * *